US008856833B2

(12) United States Patent
Conness et al.

(10) Patent No.: US 8,856,833 B2
(45) Date of Patent: Oct. 7, 2014

(54) MAINTAINING A USER PROFILE BASED ON DYNAMIC DATA

(75) Inventors: Jason William Conness, Los Angeles, CA (US); Mark Frederick Dawson, Sherman Oaks, CA (US)

(73) Assignee: United Video Properties, Inc., Santa Clara, CA (US)

( * ) Notice: Subject to any disclaimer, the term of this patent is extended or adjusted under 35 U.S.C. 154(b) by 219 days.

(21) Appl. No.: 11/986,461

(22) Filed: Nov. 21, 2007

(65) Prior Publication Data

US 2009/0133069 A1 May 21, 2009

(51) Int. Cl.
*H04N 5/445* (2011.01)
*H04N 21/45* (2011.01)
*H04N 21/482* (2011.01)
*H04N 21/4788* (2011.01)
*H04N 7/173* (2011.01)
*H04N 21/658* (2011.01)
*H04N 21/25* (2011.01)
*H04L 29/08* (2006.01)
*H04N 21/442* (2011.01)

(52) U.S. Cl.
CPC ....... *H04N 5/44543* (2013.01); *H04N 21/4532* (2013.01); *H04N 21/4828* (2013.01); *H04N 21/4788* (2013.01); *H04N 7/173* (2013.01); *H04N 21/6582* (2013.01); *H04N 21/252* (2013.01); *H04L 67/306* (2013.01); *H04L 67/06* (2013.01); *H04N 21/44222* (2013.01)
USPC ................................. 725/46; 725/45; 725/61

(58) Field of Classification Search
CPC .................... H04N 21/4532; H04N 21/44222; H04N 21/44543

USPC ................................................ 725/46, 38, 45
See application file for complete search history.

(56) References Cited

U.S. PATENT DOCUMENTS

| 5,732,216 | A | 3/1998 | Logan et al. |
|---|---|---|---|
| 6,239,794 | B1 | 5/2001 | Yuen et al. |
| 6,388,714 | B1 | 5/2002 | Schein et al. |
| 6,564,378 | B1 | 5/2003 | Satterfield et al. |
| 6,756,997 | B1 | 6/2004 | Ward, III et al. |
| 7,165,098 | B1 | 1/2007 | Boyer et al. |
| 7,185,335 | B2 | 2/2007 | Hind et al. |
| 7,451,470 | B2 | 11/2008 | Zimmerman |
| 7,680,882 | B2 | 3/2010 | Tiu, Jr. et al. |
| 7,756,895 | B1 | 7/2010 | Emigh |
| 7,904,924 | B1 * | 3/2011 | de Heer et al. .................. 725/46 |

(Continued)

FOREIGN PATENT DOCUMENTS

| EP | 1841219 A2 | 10/2007 |
|---|---|---|
| JP | 2003-250146 | 9/2003 |

(Continued)

OTHER PUBLICATIONS

Office Action Issued Jul. 8, 2010 in U.S. Appl. No. 11/986,463.

(Continued)

*Primary Examiner* — Nathan Flynn
*Assistant Examiner* — Sumaiya A Chowdhury
(74) *Attorney, Agent, or Firm* — Ropes & Gray LLP

(57) ABSTRACT

The present invention allows users to interact with people, who have interacted with other people, and obtain media files and recommendations from those having common interests, thereby creating interactive media communities and spawning electronic social networks based on media and other types of electronic entertainment.

35 Claims, 14 Drawing Sheets

(56) References Cited

U.S. PATENT DOCUMENTS

| | | |
|---|---|---|
| 8,046,801 B2 | 10/2011 | Ellis et al. |
| 2002/0065802 A1 | 5/2002 | Uchiyama |
| 2002/0140728 A1 | 10/2002 | Zimmerman |
| 2002/0174430 A1 | 11/2002 | Ellis et al. |
| 2003/0110499 A1 | 6/2003 | Knudson et al. |
| 2003/0144862 A1* | 7/2003 | Smith et al. .................. 705/1 |
| 2003/0226146 A1* | 12/2003 | Thurston et al. ............. 725/46 |
| 2004/0103434 A1 | 5/2004 | Ellis |
| 2004/0260574 A1 | 12/2004 | Gross |
| 2005/0060743 A1 | 3/2005 | Ohnuma et al. |
| 2005/0160458 A1 | 7/2005 | Baumgartner |
| 2005/0204388 A1 | 9/2005 | Knudson et al. |
| 2005/0251827 A1 | 11/2005 | Ellis et al. |
| 2005/0262542 A1* | 11/2005 | DeWeese et al. ............ 725/106 |
| 2005/0273812 A1 | 12/2005 | Sakai |
| 2006/0010478 A1* | 1/2006 | White et al. ................. 725/102 |
| 2006/0053449 A1* | 3/2006 | Gutta ............................. 725/46 |
| 2006/0150216 A1* | 7/2006 | Herz et al. ..................... 725/50 |
| 2006/0190966 A1 | 8/2006 | McKissick et al. |
| 2006/0271959 A1* | 11/2006 | Jacoby et al. ................. 725/46 |
| 2007/0136745 A1 | 6/2007 | Garbow et al. |
| 2007/0157242 A1 | 7/2007 | Cordray et al. |
| 2007/0214162 A1 | 9/2007 | Rice |
| 2007/0250866 A1 | 10/2007 | Yamada |
| 2008/0301732 A1 | 12/2008 | Archer et al. |
| 2009/0133070 A1 | 5/2009 | Hamano et al. |

FOREIGN PATENT DOCUMENTS

| | | |
|---|---|---|
| JP | 2007-158925 | 6/2007 |
| WO | WO-0146843 | 6/2001 |
| WO | WO 03/030528 | 4/2003 |
| WO | WO 2004/054264 | 6/2004 |
| WO | WO-2004052010 | 6/2004 |
| WO | WO-2009070193 | 6/2009 |

OTHER PUBLICATIONS

Final Office Action for U.S. Appl. No. 11/986,463 dated Mar. 23, 2011.

Non-Final Office Action for U.S. Appl. No. 11/986,463 dated Apr. 13, 2012.

Final Office Action issued on Dec. 6, 2012 in U.S. Appl. No. 11/986,463, filed Nov. 21, 2007.

Non-Final Office Action issued on Jul. 17, 2013 in U.S. Appl. No. 11/986,463, filed Nov. 21, 2007.

U.S. Appl. No. 09/332,244, filed Jun. 11, 1999, Ellis et al.

U.S. Appl. No. 11/324,202, filed Dec. 29, 2005, Doug Yates.

U.S. Appl. No. 11/412,549, filed Apr. 27, 2006, Ellis et al.

U.S. Appl. No. 11/541,299, filed Sep. 29, 2006, Shannon et al.

Office Action issued in U.S. Appl. No. 11/986,463, filed Nov. 21, 2007.

* cited by examiner

| Provider ID | My Guide | | | | |
|---|---|---|---|---|---|
| Date/Time | Additional Information about user selection | | | | |
| My Guide | Listings | On Demand | DVR | Search | |
| Friend 1 Recommendation | | On Next | | Hot List | |
| | Title 1<br>Time Channel ID | | Title 5<br>Time Channel ID | | Title 9<br>Time Channel ID |
| | Title 2<br>Time Channel ID | | Title 6<br>Time Channel ID | | Title 10<br>Time Channel ID |
| | Title 3<br>Time Channel ID | | Title 7<br>Time Channel ID | | Title 11<br>Time Channel ID |
| | Title 4<br>Time Channel ID | | Title 8<br>Time Channel ID | | Title 12<br>Time Channel ID |
| A D V E R T I S E M E N T | | | | | |

902 points to Provider ID/Date/Time area.

| Logo of Provider | Text Entry Box | Search | Advertisement |
|---|---|---|---|
| Home | Join the Discussion | My Favorites | My Guide | My Friends |

1002 → Logo of Provider; 1018 → Search area.

| On Now (1004) | On Next (1006) | Hot List (1008) |
|---|---|---|
| Time | Listing 1 | Recommendation 1 |
| Listing 1 | Listing 2 | Recommendation 2 |
| Listing 2 | Listing 3 | Recommendation 3 |
| Listing 3 | Listing 4 | Recommendation 4 |
| Listing 4 | | |

| Available Media by Type (1010) | Available Media by Genre (1014) | Message Board (1020) |
|---|---|---|
| Media Listing 1 | Listing 1 | Friend 1: Hi |
| Media Listing 2 | Listing 2 | User: Hi, how are you? |
| Available Media by Source (1012) | Available Media by Mood (1016) | |
| Listing 1 | Listing 1 | |
| Listing 2 | Listing 2 | |

FIG. 10

MAINTAINING A USER PROFILE BASED ON DYNAMIC DATA

BACKGROUND OF THE INVENTION

Media delivery systems provide a substantial amount of media to users. Consequently, many users desire a form of media guidance through an interface that allows users to efficiently navigate among media selections, as well as local and remote devices, and to easily identify media that they may desire. An application which provides such guidance is referred to herein as an interactive media guidance application or, sometimes, a media guidance application or a guidance application.

Interactive media guidance applications may take various forms and be implemented on various devices depending on the media for which they provide guidance. One typical type of media guidance application implemented on user television equipment is an interactive television program guide. Interactive television program guides (sometimes referred to as electronic program guides) are well-known guidance applications that, among other things, allow users to navigate among and locate many types of media content including conventional television programming (provided via a television network), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the media that has traditionally only been available through a television. Consequently, media guidance is necessary on these devices as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

In addition to allowing people greater access to media, recent technological advances have also made it easier for people to locate and communicate with other people that have similar interests. For example, social networking websites, such as MYSPACE™ and FRIENDSTER™, allow users to create a user-defined website that can act as a catalyst for meeting new people or staying in touch with old friends. (MYSPACE™ and FRIENDSTER™ are trademarks respectively owned by MySpace, Inc. and Friendster, Inc.) These social networking tools, however, are largely dependent on the information the user enters directly into them and are not, for example, integrated with other user profiles or user equipment, such as user television equipment.

Systems and methods for generating, maintaining and utilizing other types of user profiles, such as user profiles associated with television programming and other types of media, are discussed in, for example, commonly-assigned U.S. Pat. No. 7,185,355, issued Feb. 27, 2007, U.S. Patent Publication No. 2002/0174430, published Nov. 21, 2002, and U.S. Patent Publication No. 2005/0160458, published Jul. 21, 2005, which are each incorporated by reference herein in its entirety. In addition, commonly-assigned U.S. Patent Publication No. 2007/0157242, published Jul. 5, 2007 and U.S. patent application Ser. No. 11/809,341, filed May 31, 2007, which are each incorporated by reference herein in its entirety, discuss associating the viewing history and recording-related actions with a user profile that can be shared and/or implemented among a plurality of user equipment devices. However, there still exists a need for systems and methods that search for and display user profile information to other users based on, for example, viewing history or recording-related actions associated with a user profile. There is also a need for systems and methods that allow a user to access a particular user profile and provide and/or receive programming recommendations based on and to that user profile.

SUMMARY OF THE INVENTION

In accordance with the principles of the present invention, user equipment, friendly equipment and a central server can be combined to create an interactive media guidance system. Various applications can be implemented on the user equipment, friendly equipment and central server. The user equipment, friendly equipment and central server may also comprise and/or have direct access to one or more digital storage devices, as well as remote access to each other's storage devices. The storage devices may be used to store, among other things, media data that may be associated with the user or a friend. Data associated with the user is sometimes referred to herein as user data and data associated with a friend is sometimes referred to herein as friendly data.

The media guidance application implemented on user equipment (sometimes referred to herein as the user media guidance application) can be configured to, for example, generate and automatically maintain user data. The user data may be subdivided into different types of data and stored as separate files. For example, user data may include user profile data, authorization data, system data, scheduling data, media data, calendar data, account data, etc. Various commands may be embedded or, more generally, associated with the user data. For example, the user data may include data generated in response to and/or representing one or more system commands. System commands are groups of data that instruct one or more components of the user equipment, friendly equipment and/or server equipment to perform some sort of task. Some of examples of system commands include a recording command, a series recording command, a reminder command, a delete command, a user recommendation command, an order command (for, e.g., Pay-Per-View or On-Demand programming), a display command, etc.

Similarly, a media guidance application may be implemented on friendly equipment. Such media guidance applications are sometimes referred to herein as friendly guidance applications. The friendly media guidance application and friendly equipment may function the same as or similar to the user media guidance application and user equipment. The only difference between the user media guidance application and equipment and the friendly media guidance application and equipment is that a friend, not the user, uses the friendly media guidance application and equipment.

User equipment and friendly equipment may communicate directly using various communications paths and communication protocols. In some embodiments, user equipment and friendly equipment may communicate indirectly through a central server. Both user and friendly equipment may be used to generate system commands that can be executed by the other type of equipment. System commands can be generated in response to receiving a user or friendly input or modification command. A modification command is an electronic command that causes user or friendly data to be modified.

A modification command, search command and any other command discussed herein may be conditioned on dynamic data. Dynamic data, such as data related to a user's or friend's viewing history, can automatically change over time. A user may, for example, condition media associated with the user's personal dashboard on dynamic data. For example, the user's profile may include all non-offensive media that a friend recommends. If, however, the friend's media recommendations become dangerous (e.g., include illegal web content) or inappropriate for children, the user media guidance application may automatically place the friend on a block list and/or delete the association of the friend's recommendations with the user's profile. As another example, the user's profile may be configured to include modules related to sports in general and, as the sports seasons change, the types of modules associated with the user's profile may also change.

The central server can be used, for example, to facilitate the transfer of data between user equipment and friendly equipment. User and friendly equipment may upload all user and friendly data to the server, or a subset thereof. The server may store all user and friendly profile data that the server receives. Before the server facilitates the transfer of information, the server may require that the it receives authorization data from the user equipment and/or friendly equipment. In this manner, the server may also act as a gatekeeper and restrict the transfer of data.

The user equipment and friendly equipment may include a display screen and processor. The processor may generate and display information based on user data and/or friendly data. In some embodiments, user information and friendly information can be displayed simultaneously. The information may be displayed as lists, modules, etc. and be grouped/ordered in any number of ways (e.g., by theme, mood, user/friend-defined criteria, etc.). In addition, the user equipment may allow the user to modify friendly data, just as the friendly equipment may allow a friend to modify user data. These modifications may include the addition of friendly data to user data and vice-versa.

BRIEF DESCRIPTION OF THE DRAWINGS

The above and other features of the present invention, its nature and various advantages will be more apparent upon consideration of the following detailed description of the disclosure, taken in conjunction with the accompanying drawings, in which like reference numerals refer to like parts throughout, and in which:

FIG. 5-19 shows and illustrative media application display screens used in accordance with various embodiments of the present invention; to generate channel data;

DETAILED DESCRIPTION OF THE PREFERRED EMBODIMENTS

The media guidance application of the present invention may use application data to change its display screens and available options. Such application data may originate from computers located at one or more suitable facilities or locations (which are discussed below, for example, in connection with FIGS. 21-22). The following is a description of various media guidance application display screens, options, configurations and methods related to features in accordance with various embodiments of the present invention.

One of the functions of the media guidance application is to provide media listings and media information to users. FIGS. 1-19 show illustrative display screens that may be used to provide media guidance by, for example, presenting media listings and other selectable display components. The display screens shown in FIGS. 1-19 may be implemented on any suitable device or platform. While the displays of FIGS. 1-19 are illustrated as full screen displays, they may also be fully or partially overlaid over media content or other display screens being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide the appropriate display screen with media information organized in one of several ways, such as by time and channel in a grid, by time, by channel, by media type, by category (e.g., movies, sports, news, children, or other categories of programming), or other predefined, user-defined, or other organization criteria.

Figure 1:
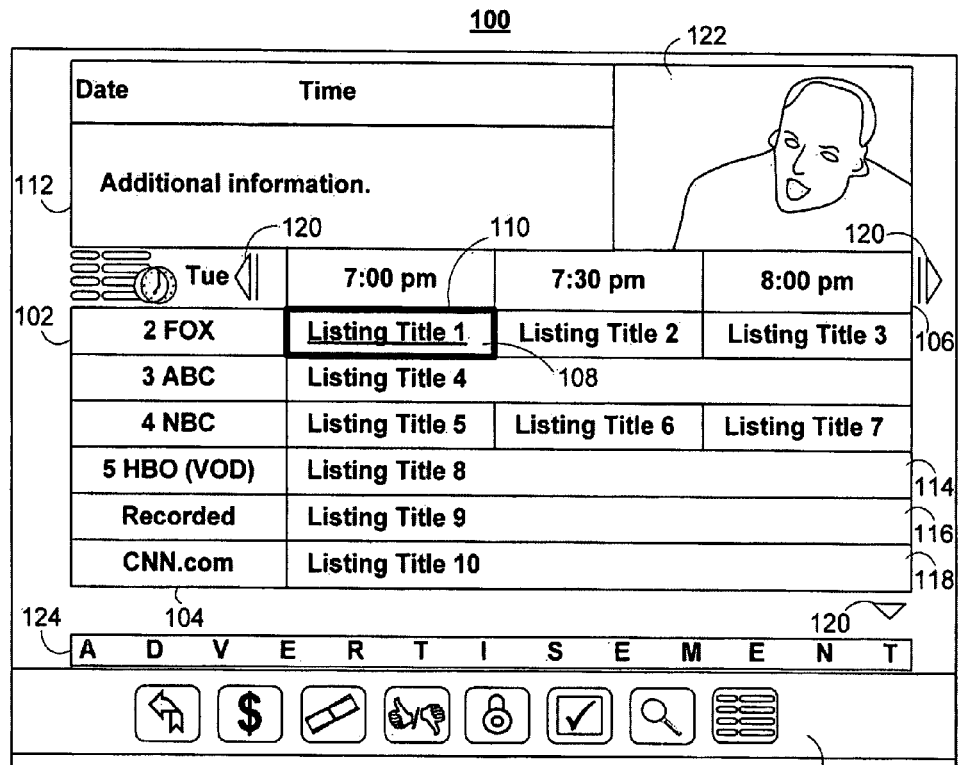
FIGS. 1-2 show illustrative grid program listings display screens in accordance with various embodiments of the present invention.

Display 100 of FIG. 1 is an illustrative grid program listings display arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Additional information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO ON DEMAND™ providing THE SOPRANOS™ and CURB YOUR ENTHUSIASM™). HBO ON DEMAND™ is a service mark owned by Time Warner Company L. P. et al. and THE SOPRANOS™ and CURB YOUR ENTHUSIASM™ are trademarks owned by the Home Box Office, Inc. Internet content may include web events, such as a chat session or Webcast, or content available on-demand as streaming media or downloadable media through an Internet web site or other Internet access (e.g., FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on any type of use-related data (sometimes referred to herein as "user data"), such as, e.g., a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

Figure 2:
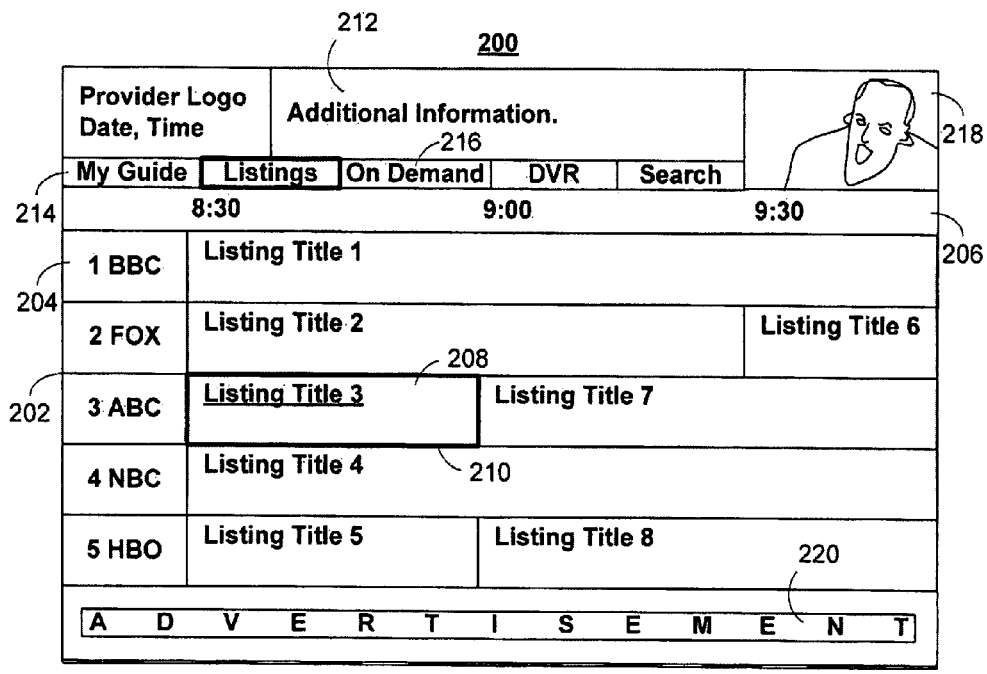

Display 200 of FIG. 2 is another illustrative grid program listings display arranged by time and channel. Display 200 may include some components and interface features that are similar to or the same as those shown in display 100. In particular, display 200 is illustrated as including grid 202, channel/media type identifiers 204, and time identifiers 206, which respectively correspond to grid 102, channel/media type identifiers 104, and time identifiers 106 discussed above. Grid 202 also includes cells of program listings, such as program listing 208, where each listing provides the title of the program provided on the listing's associated channel and time. A user input device can be used as described above to interact with display 200 (e.g., moving highlight region 210) or any other display discussed herein in the same manner discussed above. Additional information relating to the program listing selected by highlight region 210 may be provided in program information region 212.

Tabs region 214 can be used to provide options that, when selected, allow the user to interact with various display screens. These display screens can include one or more customizable interactive user interfaces that deliver personalized media across multiple media platforms. For example, tabs region 214 can include one or more options that allow the user to access types of programming (such as, e.g., non-linear programming) that are not included in grid 202 and/or that are organized in a user-specific manner (as opposed to a traditional, system generated manner as shown in display 200). For example, in response to On Demand option 216 being selected, the media guidance application may present a listings grid or other type of display associated with On Demand programming and/or configuration settings. In some embodiments, grid 202 may also include listings for non-linear programming (not shown) and cause display 200 to be a mixed-media display.

Display 200 may also include video region 218 and advertisement 220, which may be similar to or the same as video region 122 and advertisement 124, respectively discussed above.

Figures 3, 4:
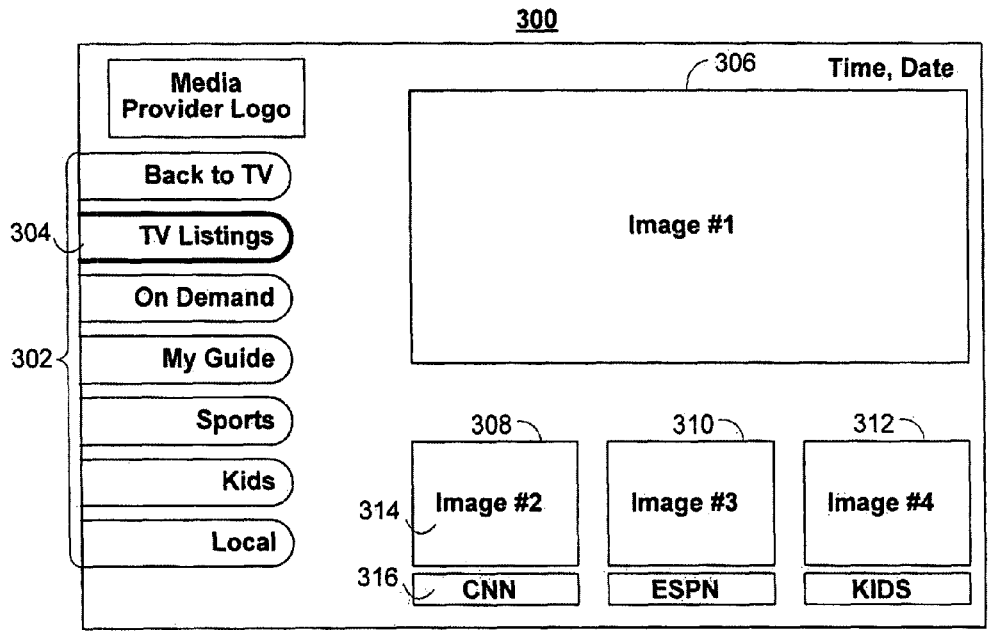
FIG. 3 shows an illustrative video mosaic program listings display screen in accordance with one embodiment of the present invention.
FIG. 4 shows an illustrative grid program listings display screen in accordance with one embodiment of the present invention.

Another display arrangement for providing media guidance is shown in FIG. 3. Video mosaic display 300 includes selectable options 302 for media content information organized based on media type, genre, and/or other organization criteria. In display 300, television listings option 304 is selected, thus providing listings 306, 308, 310 and 312 as broadcast program listings. Unlike the listings shown in the other figures discussed herein, the listings in display 300 are not limited to simple text (e.g., the program title) and icons to describe media. In display 300 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 308 may include more than one portion, including media portion 314 and text portion 316. Media portion 314 and/or text portion 316 may be selectable to view video in full-screen or to view program listings related to the video displayed in media portion 314 (e.g., to view listings for the channel that the video is displayed on).

The listings in display 300 are of different relative sizes (i.e., listing 306 is shown as being larger than listings 308, 310, and 312), but if desired all the listings may be the same size as shown in, e.g., FIG. 4. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information (which can be processed into machine-readable data) or may automatically compile user profile data. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

FIG. 4 illustrates display 400, which is an example of a display that is personalized for a user. Display 400 is illustrated as a modular media guidance dashboard application display, sometimes referred to herein as a dashboard. Modular media guidance dashboard applications and application displays are discussed further in commonly assigned Shannon et al., U.S. patent application Ser. No. 11/541,299, filed Sep. 29, 2006, which is incorporated herein by reference in its entirety. Although display 400 includes tabs region 402, which is similar to or same as tabs region 214 of FIG. 2, one skilled in the art would appreciate that display 400 may be presented in response to, e.g., receiving a user selection of an option from any type of display (such as, e.g., one of selectable options 302 in display 300), logging in to the guidance application, etc.

Display 400 illustrates a customizable interactive user interface that includes On Now module 404, On Next module 406 and Hot List module 408. These particular modules may be included in display 400 for various reasons. For example, a user profile may cause one or more of these modules to be included in display 400. As another example, the user may have specifically selected one or more of the modules to be included in display 400. As yet another example, another person, such as a friend of the user, may have associated one or more of the module's with display 400.

As illustrated, each module is associated with media files, and each media file can have at least one corresponding media listing, which may be selected. A user can utilize a user input device to navigate highlight region 410 to surround and select any of the media listings. In response to a listing being selected, the media guidance application may generate a new display, which may include retrieving data and presenting media or information to a user, and/or performing any other command associated with the selected media listing (e.g., scheduling a program for recording, setting a reminder, associating a program with a favorites list or user profile, etc.).

On Now module 404, On Next module 406 and Hot List module 408 are the only three modules included in display 400. Additional or fewer modules may be included in display 406, just like any other display of the present invention. In some embodiments, particular modules are automatically associated with particular displays by the media guidance application. In other embodiments, the user may configure how many and which modules can be included in any given display. For example, display 400 could be limited to only three modules and be configured to include one or more recommended modules. Such configurations, like all other user-specified settings are saved as user preference data, or more generally as a file of user data.

Figure 5:
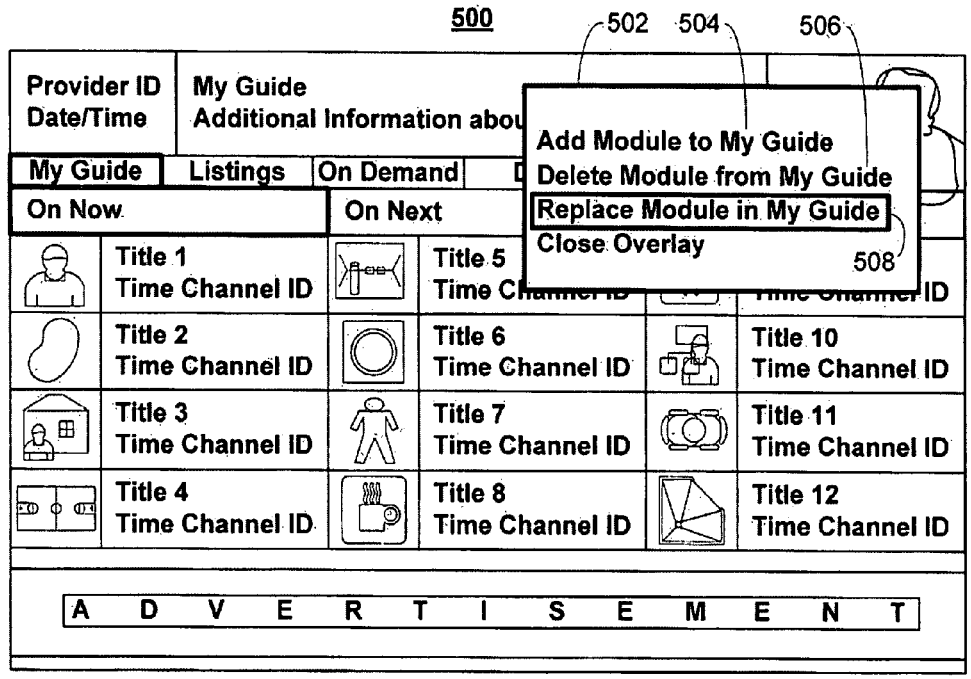

Display 500 of FIG. 5 illustrates an exemplary display that may be presented to the user in response to the media guidance application receiving a user indication to manually configure (or reconfigure) which the modules are included in, e.g., display 400. Display 500 includes overlay 502. Overlay 502 may include selectable options, such as, e.g., add module option 504, delete module option 506, and replace module option 508. In some instances, the options included in overlay 502 can be module-specific and displayed in response to a portion of a module being selected (such as, e.g., an icon (not shown), the module header (i.e., the portion of the module that includes the module name), etc.). In other instances, overlay 502 can be generic and the media guidance application may ask the user to associate a module with a selected option after the option is selected. For example, in response to add module option 504 being selected, the interactive media guidance application may generate a display that allows the user to add a module to display 400. As another example, in response to delete module option 506 being selected, the interactive media guidance application may generate a display that allows the user to delete the association of a module with display 400. Replace module option 508 may cause the media guidance application to generate, for example, display 600.

Figure 6:
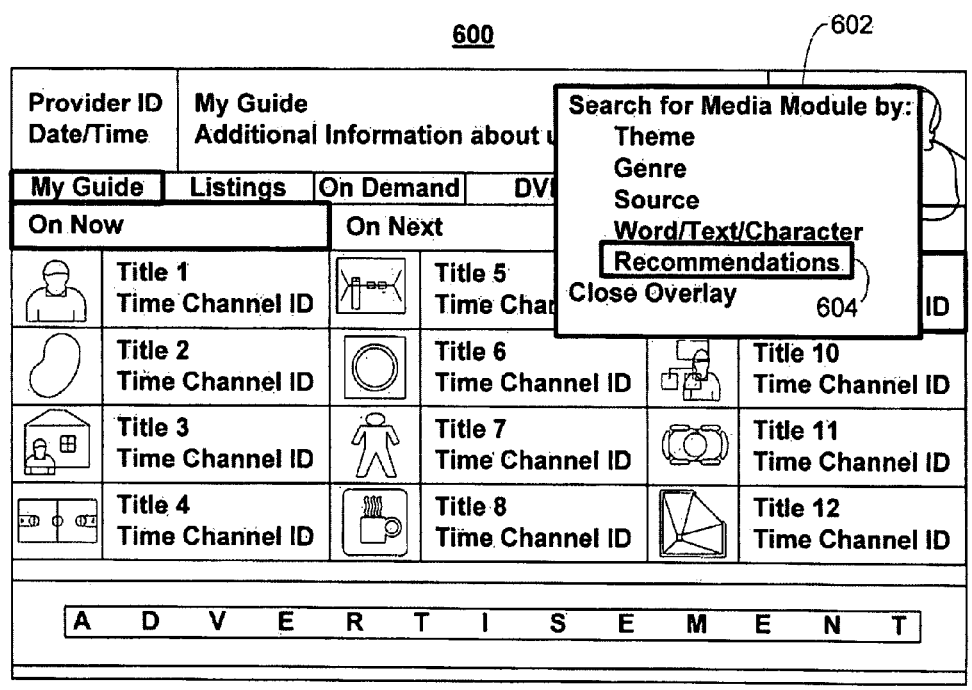
Figure 11:
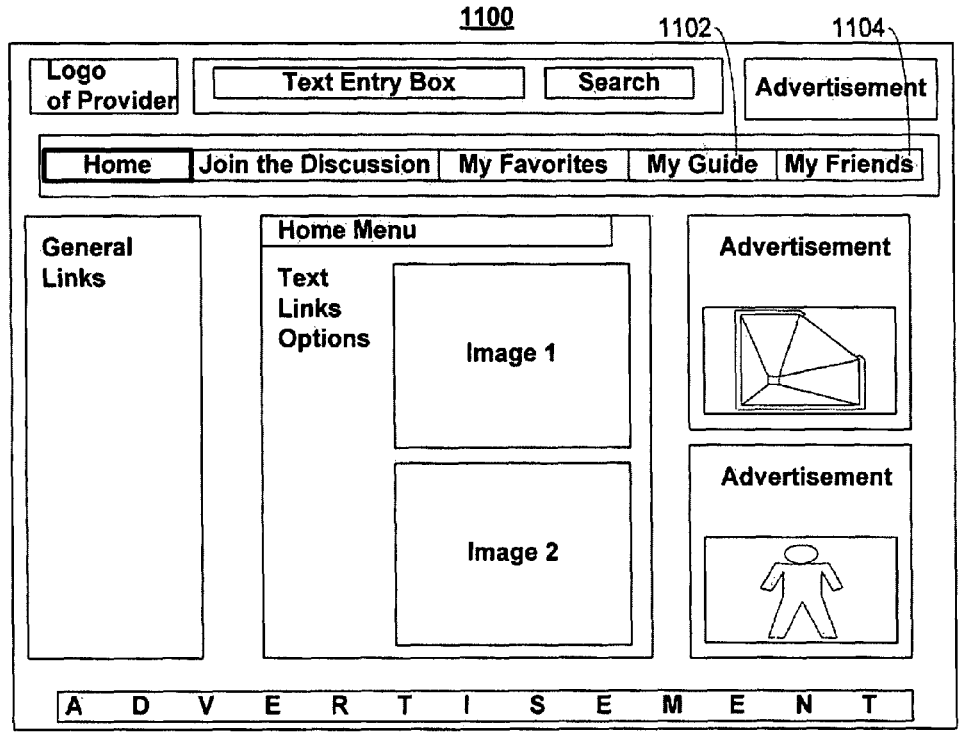

Display 600 is illustrated in FIG. 6. Overlay 602 may be included in display 600. Overlay 602 includes module options. (Similar or the same options may also be provided in response to receiving a selection of add module option 504). The user can highlight and select any of the module options included in overlay 602. The selection of any option in any display may cause the media guidance application to execute one or more commands. The commands may assist the user in, for example, customizing display 400 by, e.g., finding, adding and/or creating a new module based on theme of media (horror, comedy, etc.), media genre, media type (television program, website, etc.), media source (e.g., satellite television, cable television headend, Internet, mobile telephone network, etc.), word(s) related to media, etc.

Figures 7, 8:
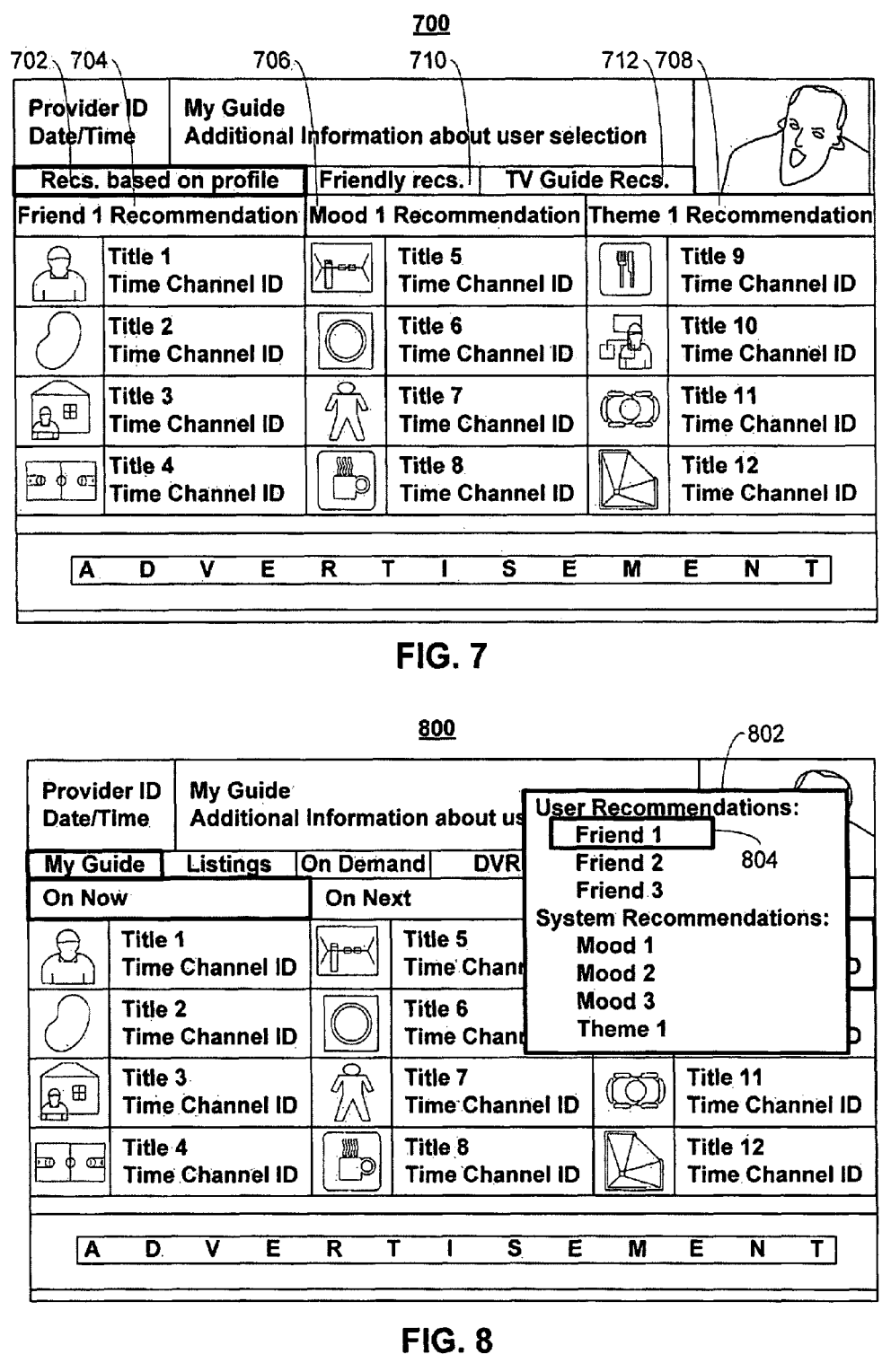

For example, in response to receiving a user selection of recommendation option 604, the media guidance application can present to the user display 700 of FIG. 7 or display 800 of FIG. 8. Display 700 includes tabs region 702 as well as three recommended modules, i.e., module 704, module 706 and module 708. Modules 704, 706 and 708 preferably correspond with option 702. In response to another option (which is included in, e.g., tabs region 702) being selected, display 700 can be updated to include additional and/or different modules. For example, in response to option 710 being selected, one or more friendly recommendation modules of media can be included in display 700.

Each module, as shown in FIG. 7, can be associated with one or more media files. In display 700, each media file is represented by a corresponding media listing. In response to a media listing being selected, the media file (e.g., television program, audio song, etc.) can be played back, additional information can be displayed, etc. In some instances, the association between one or more media files and a module can be automatically created by, e.g., a data service provider (such as TV Guide Online), a media guidance application implemented on user equipment, etc. In other instances, the association between one or more media files and a module can be manually configured in response to a device receiving user-inputs from the user or another person. The other person is often referred to herein as a friend, even though the other person may be a complete stranger to the user of the present invention.

In some embodiments, the automatically generated association between a module and media files can be based on, for example, usage data (e.g., television programming viewing history, website viewing history, telephone calls made by a mobile telephone, etc.), user profile data, and/or friendly profile data. A friendly profile can be generated using friendly profile data the same way a user profile can be generated based on user profile data. Like the user's relationship with user profiles discussed and incorporated by reference above, a friend (and/or an application running on a friend's user equipment) can configure and maintain a friendly profile. When dynamic data, such as usage data, is utilized, a user/friendly profile can automatically change over time. For example, a user may be an avid sports fan who likes to watch all types of sports. A person, who only likes football and has a friendly profile based on usage data, may be a seasonal friend of the user during football season. In other words, the present invention may only recommend a module associated with the friend when the friend's profile matches some aspects of the user's profile, and not during any other time of the year. This may allow the user to be introduced to new people and disassociated with others over time as the user's and friend's interests in media converge and diverge.

For example, Friend_1 represents a friend of the user. Module 704 is illustrated as including at least four listings that Friend_1 (or an application implemented on Friend_1's equipment) associated with module 704. Module 704 may be made available to the user as a recommendation after Friend_1, e.g., published module 704 for all users or shared module 704 with one or more specific people (including the user). The specific people can be, e.g., personal friends of Friend_1, people associated with Friend_1's social networking website(s), people in a given chat room, people on Friend_1's e-mail or instant messaging buddy list(s), those who provide Friend_1's equipment a preconfigured password (and/or username), etc.

In other embodiments, Friend_1 may post contact information and allow one or more other people (as well as user) to introduce themselves, thereby allowing a social networking web of people to be constructed based on the media files people watch and/or interact with. As such, the present invention may allow the user to send and/or receive requests to be a friend, which would allow the media guidance application to access data (sometimes referred to as friendly data) that is associated with another person.

In other embodiments, Friend_1 can be a theoretical person created by another user or media service provider. For example, Friend_1 can be a hypothetical person that enjoys action movies. When, for example, the user's profile is associated with action programming, Friend_1's action module may be recommended to the user in display 700.

The user may select module 704 and, in response, module 704 can be associated with the user's profile and/or a particular display, such as the user's dashboard (which is labeled as "My Guide" in FIG. 7). Module 704 can be associated with other user data (i.e., data associated with a particular user) using any means known by those skilled in the art (e.g., the user selecting module 704, dragging and dropping module 704 onto the user's dashboard, etc.).

The media guidance application can also present display 800 of FIG. 8 to the user. Display 800 may be presented to the user instead of display 700 or in response to receiving a different user selection. Display 800 includes overlay 802 that lists names of modules that can be associated with other user data. Each name in the list is a selectable option. For example, Friend_1 option 804 can be selected and, in response, the corresponding module may be associated with, e.g., the user's dashboard, user profile, etc.

Overlay 802 also includes system recommendations. For example, system recommendations, like friendly recommendations, can be modules of media that each comprises one or more media files that have at least one common characteristic. The system recommendations, unlike friendly recommendations, are generated based on, e.g., a service provider's grouping of media files and not generated based on user friendly data associated with a person. Media files can be grouped based on, for example, mood, theme, genre, etc. and can be included in overlay 802. Moods and other advanced search features are discussed further in commonly assigned Ellis et al., U.S. patent Ser. No. 11/412,549, filed Apr. 27, 2006, which is incorporated herein by reference in its entirety.

FIG. 9 illustrates display 900, which the media guidance application may present to the user in response to the user selecting, for example, module 704 of FIG. 7 or option 804 of FIG. 8. Display 900 illustrates a display that may be presented after replacing, for example, On Now Module 404 of FIG. 4 with friendly module 902.

The displays discussed above are illustrated as being optimized for, e.g., user television equipment (e.g., television display screen, television remote control, television program guide application implemented on a set-top box, etc.). The following displays, including display 1000, are illustrated as being optimized for, e.g., web-based user equipment (e.g., computer display screen, mouse, keyboard, web browser application implemented on a computing device, etc.).

FIG. 10 illustrates display 1000, which is a variation of display 400 of FIG. 4. Display 1000 includes tabs region 1002, which may function the same as or similar to tabs region 402. On Now module 1004, On Next module 1006 and Hot List module 1008 are also included in display 1000 and can be used in the same or similar manner as On Now module 404, On Next module 406 and Hot List module 408. In addition, a user may interact with these modules and, more generally, any display in any other manner, such as those commonly used to interact with websites (e.g., search for words that may or may not be included in the display, scroll through each module independently, scroll the display down to see information that cannot fit on the screen, select links to view other displays, etc.).

Display 1000 includes a number of other modules (i.e., modules 1010, 1012, 1014 and 1016) and other display elements as well. For example, display 1000 includes searching component 1018, which can be used to search for data based on information the user enters into the text entry box of searching component 1018. Message board 1020, which may be integrated into any guide display discussed herein, can be used as an instant/text messaging service between the user and one or more other people, and/or as a portal to a chat room.

Display 1000 may be presented to the user in response to the user entering a URL into a web browser application, pressing a button on a television remote control, or by any other means. In some embodiments, another display, such as display 1100 of FIG. 11 may be presented to the user first. Display 1100 is an exemplary main menu display that may be provided by web based (or any other type of) user equipment.

Display 1100 may include a number of options, modules and/or other display components. In response to a user selection of, e.g., option 1102, the media guidance application may generate a personalized display, such as a dashboard display, for the user. The personalized display and the components included may function similar to or the same as those discussed above. Before the personalized display of FIG. 10 is presented to the user, the media guidance application may prompt the user and request authorization information.

Figure 12:
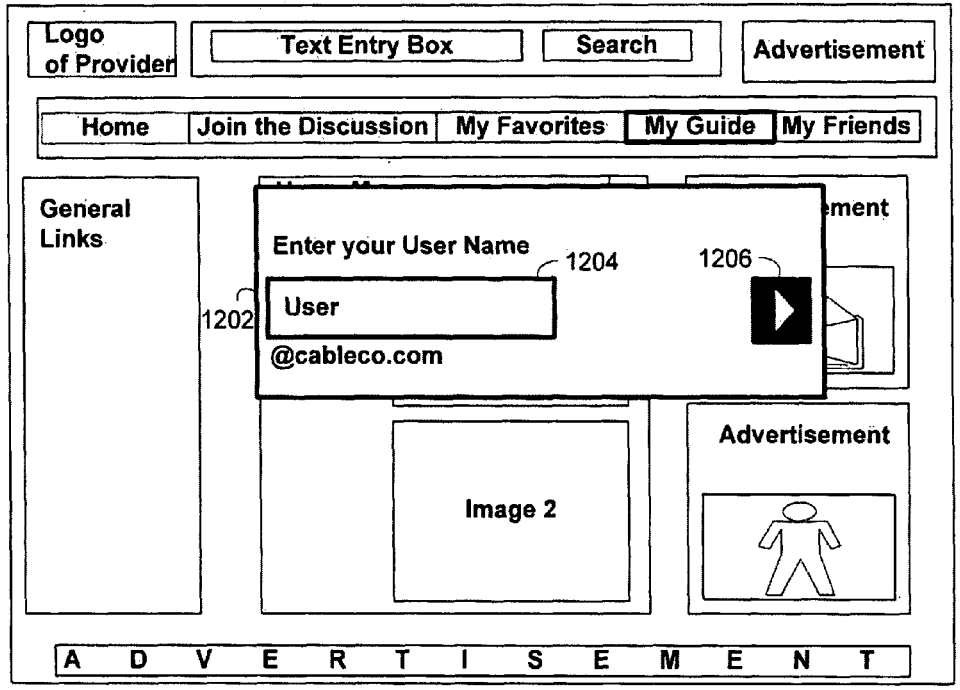

FIG. 12 illustrates exemplary display 1200, which includes authorization overlay 1202. After the user enters a username, password, etc. into text entry box 1204 and selects icon 1206, the media guidance application will verify the authenticity of the user-entered information. If the user-entered information is verified as authentic, the media guidance application may present a personalized guide, such as display 1000, to the user. Similar authentication means may also be implemented prior to the media guidance application allowing a friend to view, edit and/or make a recommendation to the user or vice-versa. One skilled in the art would appreciate that more than one text entry box and/or more than one layer of electronic security may be utilized by the media guidance application.

After the media guidance application grants the user access to the user's personalized dashboard, the user may indicate a desire to modify the personalized display, the underlying user profile, the user account settings, etc. In some embodiments, the media guidance application will synchronize some or all of the modifications the user makes to one of the user's personalized guides (e.g., the online guide, television program guide, etc.), user profiles, etc. with one or more other personalized guides, user profiles, etc.

For example, the user may be at work and want to schedule a program for recording at home. The user can indicate a desire to log into his online media guidance application, display 1100 or display 1000 may be presented, and the user can use his online program to schedule a program to be recorded by the user's home television equipment. The online media guidance application may then communicate to the television media guidance application and/or the user television equipment in the user's home, and send a command to the user television equipment to schedule the program for recording.

Figure 13:
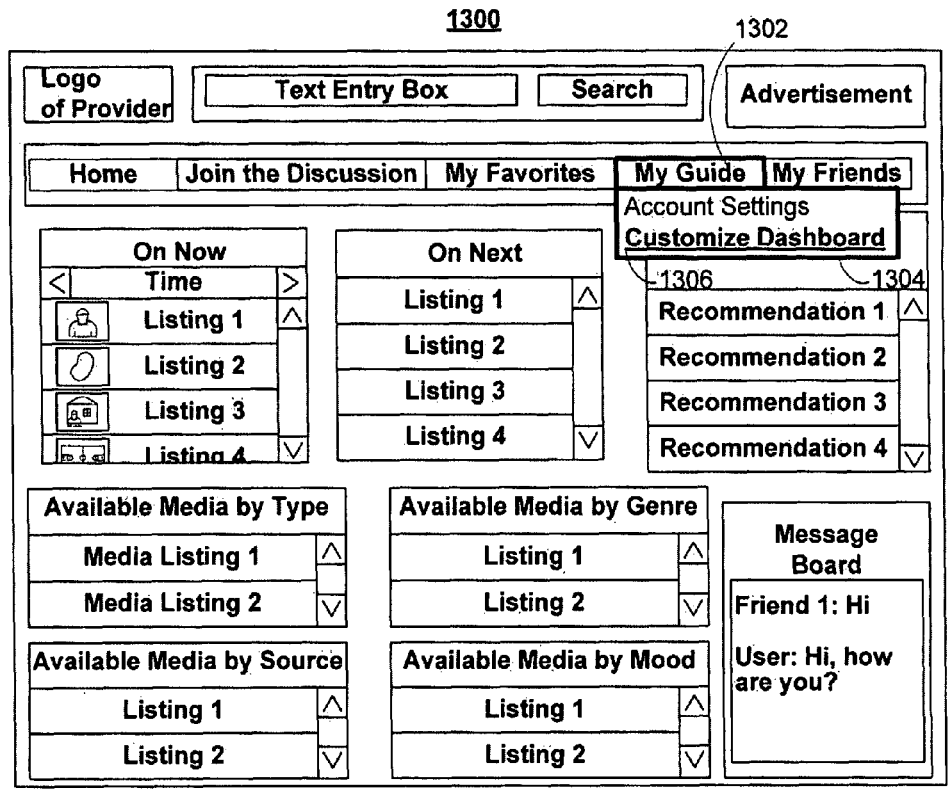

As another example, the user may change the modules included in his personalized dashboard using an online program guide, and any changes made to the user's online program guide will be synchronized with the user's television program guide. Display 1300 of FIG. 13 illustrates a display that may be presented in response to receiving a user indication of a desire to modify the user's personalized dashboard. After the user selects, for example, my guide option 1302, the media guidance application may present overlay 1304. Overlay 1304 is illustrated as including only two options, but one skilled in the art would appreciate that more or less options may be included in overlay 1304, just like any other overlay or grouping of options discussed herein. The media guidance application may determine that the user would like to modify his dashboard in response to, for example, receiving a user selection of option 1306.

Figure 14:
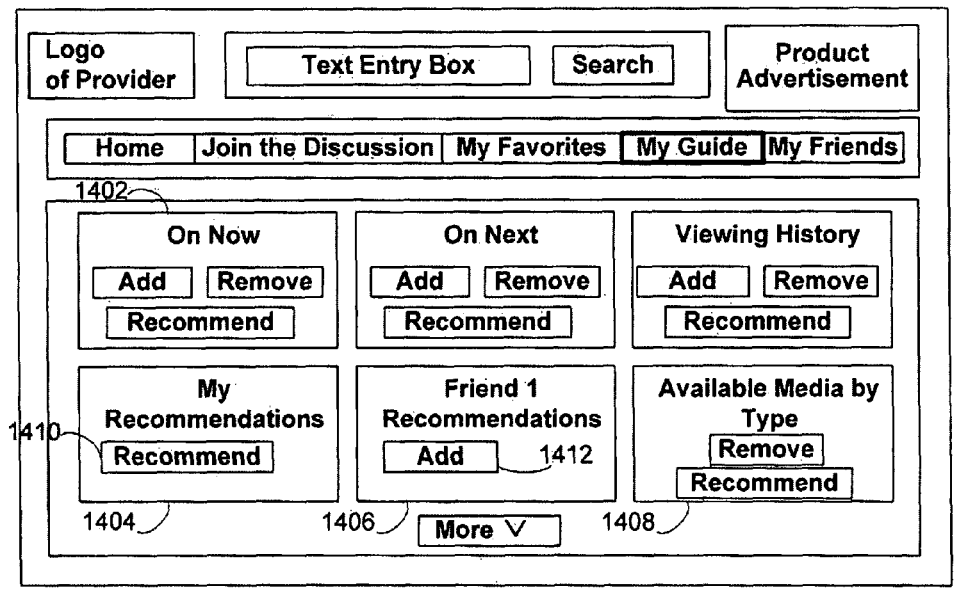

FIG. 14 illustrates display 1400, which is an exemplary display that includes options the user can use to modify the user's or a friend's dashboard. For example, one or more editing options can be associated with each module that is or could be included in one or more of the user's or friend's dashboards. Modules, such as On Now Module 1402, can be associated with add, remove and recommend options. Modules, such as My Recommendations module 1404, Friend_1

Recommendations module 1406 and Type module 1408, can be associated only with options that are only applicable to each module.

For example, in response to recommend option 1410 being selected by the user, the media guidance application may generate one or more share commands that are sent to, e.g., the service provider (and/or whichever entity or entities that maintain and/or facilitate the transfer of data among various people via their equipment and media guidance applications implemented thereon). The share command(s) may cause My Recommendations module 1404 to be made available to one or more other people. One or more distribution settings may be associated with each share command. The distribution settings control how many and which people recommendations module 1404 is made available to. The distribution settings can be automatically configured by, e.g., a service provider or manually configured by the user. In the latter case, a user may configure global distribution settings that influence all recommendations or specific distribution settings that influence one or more particular recommendations. For example, one or more additional options can be displayed (using, e.g., an overlay that is not shown) in response to the user selecting recommend option 1410. These additional options may enable the user to choose to share the corresponding module with one or more particular friends, all people, a particular group of people, etc.

An add option, such as add option 1412, can be used to associate a module with one or more user displays that the module is not already associated with. For example, in response to the user selecting add option 1412, the media guidance application can generate and present display 1500 to the user.

Figure 15:
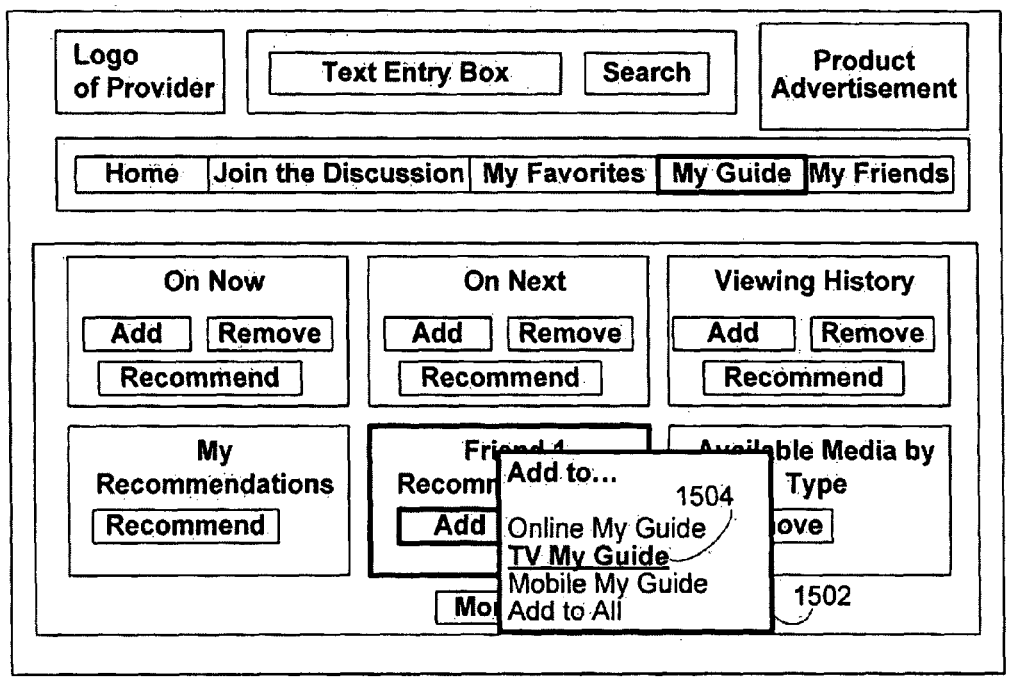

Display 1500 is shown in FIG. 15 and includes overlay 1502. Overlay 1502 may include one or more options that the user can select. In response to receiving a user selection of one of the options, the media guidance application may generate one or more corresponding commands. The commands can be distributed to the proper device(s) and/or application(s). For example, the user may be interacting with their online guide and want to have a module, which a friend previously recommended to the user, associated with the user's personalized television guide. In response to selecting option 1504 included in overlay 1502, the user's online media guidance application may generate the appropriate command(s) that are sent through the online network and servers to the user's television service provider (which may or may not be the same entity as the user's Internet service provider). In response to the command(s), the television service provider can download the appropriate data to the user's television equipment. Subsequently thereafter, the user's television guidance application may include a module that corresponds with Friend_1 Recommendations module 1406 in, for example, the user's television dashboard.

When a user would like to delete a module from a display, the user may select a remove option, such as those shown in display 15. One skilled in the art would appreciate that a single system may provide various means for carrying out the above described functions. For example, the user may select a dedicated key on a remote control while a module is highlighted on the user's dashboard and, in response, the media guidance application may present an overlay to the user to specify one or more options associated with that key selection.

Figure 16:
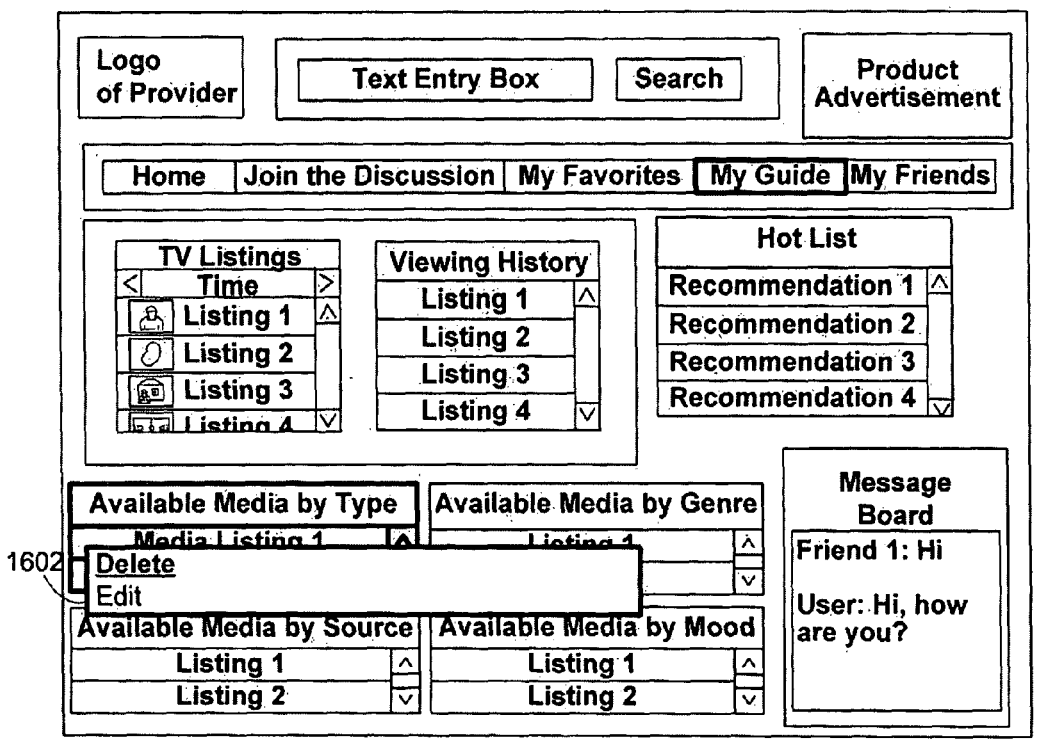

FIG. 16, for example, illustrates display 1600, which includes overlay 1602. Overlay 1602 is an example of how options may be provided to the user in response to the user, e.g., double-clicking on module 1010 of FIG. 10. In this manner, displays 1400 and 1500 may be skipped if the user wants to, e.g., delete a module's association with the user's dashboard. This method may also allow the user to indicate a desire to view an edit a display, such as display 1400.

Figure 17:
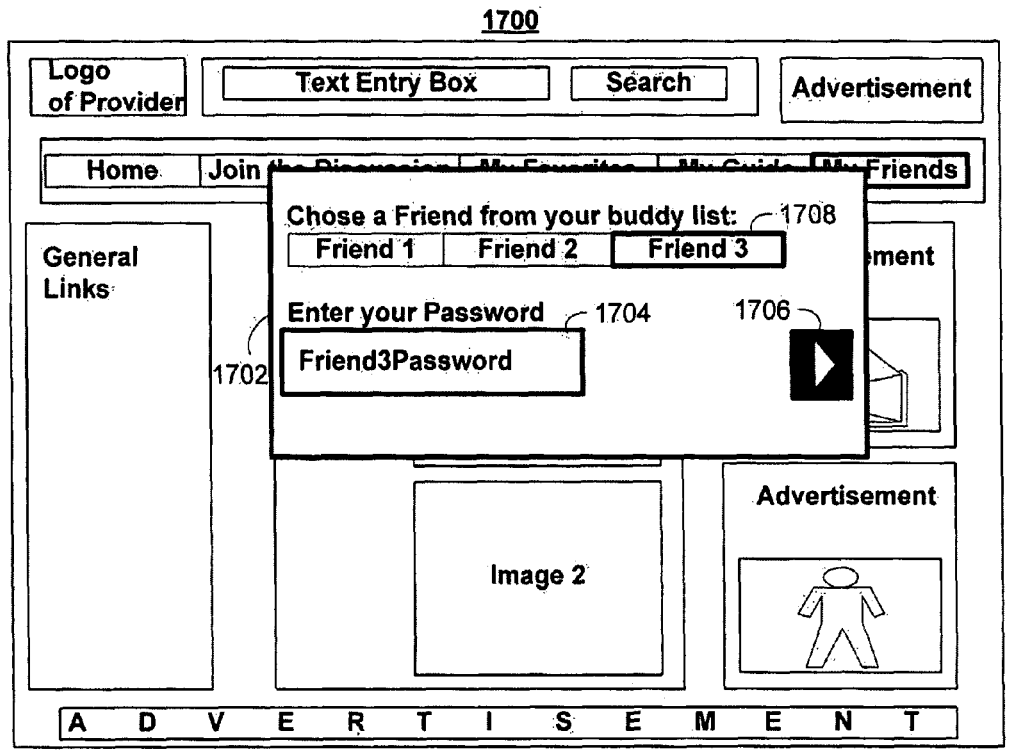

FIG. 17 illustrates display 1700, which may be displayed in response to, e.g., receiving a user indication of a desire to access a friendly data. Friendly data may be processed and displayed by a media guidance application implemented on friendly equipment into various types of user-readable information, such as friendly dashboard, friendly profile, friendly account settings, etc. (The modifier "friendly" as used herein is meant to differentiate various components, data, applications, features, etc. from the user's components, applications, features, etc.) For example, display 1700 may be displayed in response to receiving a user selection of my friends option 1104 of FIG. 11.

Display 1700 includes overlay 1702, which allows the user to enter authentication information into text entry box 1704. The authentication information can then be processed into computer-readable data and verified in response to receiving a user selection of icon 1706. In some embodiments, friends list 1708 can also be included in overlay 1702. Because the user may have to enter different authentication information for different friends, the user may first have to select which friend's data the user would like to access.

Figure 18:
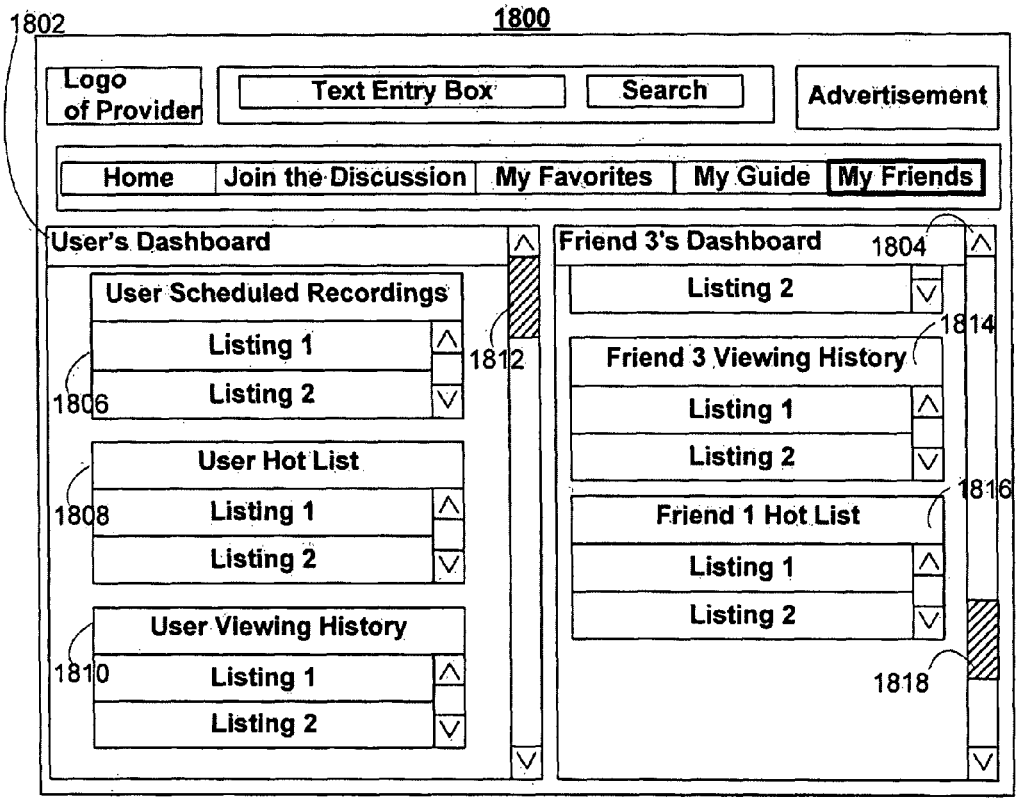

In response to the authentication information being verified, the user and/or friendly media guidance application(s) may grant the user access to the friend's data. For example, the user's media guidance application may download the friend's data and display friendly information (based on the friendly data) to the user. As another example, the user's media guidance application may act as a portal to the friend's media guidance application, thereby allowing the user to interact directly with the friendly media guidance application that is implemented on friendly equipment (as opposed to user equipment). In this manner, the present invention can allow the user, in (near) real time, to view, configure and modify at least one other user's (i.e., friend's) past, present and future media experience. In some embodiments, the media guidance application may present the friend's data in a display, similar to those discussed above, that only includes the friend's data and not the user's data. Similarly, this may allow a friend to remotely view, configure and modify the user's media experience FIG. 18 illustrates display 1800, which is an example of another approach, wherein both user data and friendly data is merged and processed into information, which is presented simultaneously for the user to view and interact with. One skilled in the art would appreciate that the present invention is not limited to presenting data associated with the user and one friend, and that the present invention may, for example, simultaneously present information associated with the user and a number of friends, only two friends, etc.

Display 1800 includes display components 1802 and 1804. Display component 1802 includes modules 1806, 1808 and 1810, which are associated with the user's dashboard. Additional modules may be associated with the user's dashboard and, if so, be displayed in response to bar 1812 being scrolled down. Display component 1804 includes modules 1814 and 1816, which are associated with the dashboard of a friend, named Friend_3. Because bar 1818 indicates that modules 1814 and 1816 are near the end of the list of modules associated with Friend_3's dashboard, additional modules may be presented in response to bar 1818 being scrolled up.

Friend_3 may configure certain limitations on how much control the user (or another friend) may have in connection with Friend_3's data (e.g., dashboard, module(s), profile, etc.). Friend_3 may restrict the user and/or other people to only be able to view some or all of the information associated with Friend_3's data. Friend_3 may grant complete access to, e.g., only the user, thereby allowing only the user to interact with Friend_3's modules, dashboard, profile, etc. in the same manner that the user may interact with his own modules, dashboard, profile, etc. (some of which are discussed herein). One skilled in the art would appreciate that various levels of control can be granted to individual people, groups of people, etc. and that the identification information discussed above can be used to determine how much control another person may have over Friend_3's data.

For example, another person, Friend_1, may have had access to Friend_3's data and/or Friend_3 may have had access to Friend_1's data. Regardless of who may have granted who access, module 1816 is shown in FIG. 18 as being associated with Friend_1 data and is now included in Friend_3's dashboard. Assuming Friend_3 has given the user the proper access privileges, the user may add module 1816 to the user's dashboard. As such, the present invention allows users to interact with people, who have interacted with other people, and obtain media files and recommendations from those having common interests, thereby creating interactive media communities and spawning electronic social networks based on media and other types of electronic entertainment.

Figure 19A:
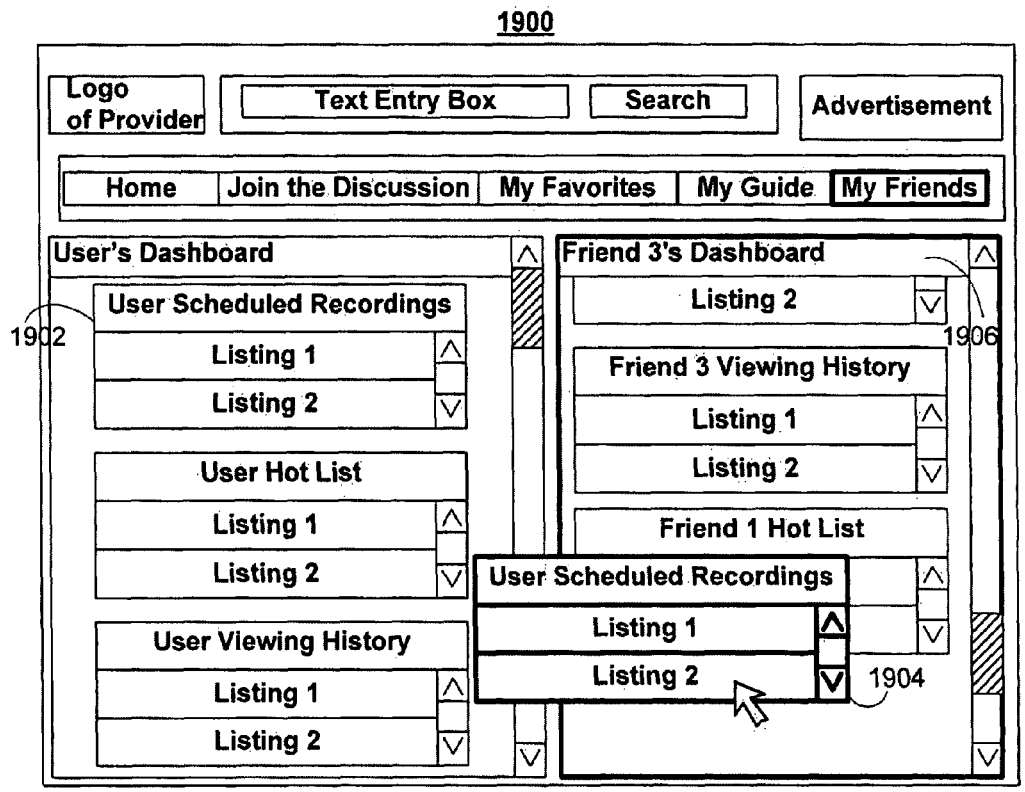

The present invention, in addition to allowing a user to experience the media life of someone else, may also, for example, allow a user to take over or modify another person's media experience. In addition to all of the features above also being available to the user when modifying a friendly profile, the user may simply add user data to friendly data. For example, the user may click, drag and drop a module onto a friend's dashboard. FIG. 19*a* shows display 1900, which is a screenshot of the user adding the data associated with module 1902 to Friend_3's dashboard. Module 1904, which is shown as it is being dragged onto Friend_3's dashboard, may be a copy of module 1902. In response to, for example, module 1904 being placed (at least mostly) within the confines of display component 1906, the media guidance application may visually indicate (e.g., by changing the color or darkness of the boarder of display component 1906, displaying an overlay confirming the user's intention, etc.) that the user is about to modify (in this case add data to) Friend_3's dashboard. If the user proceeds with the modification, module 1904 will be added to the dashboard of Friend_3.

Figure 19B:
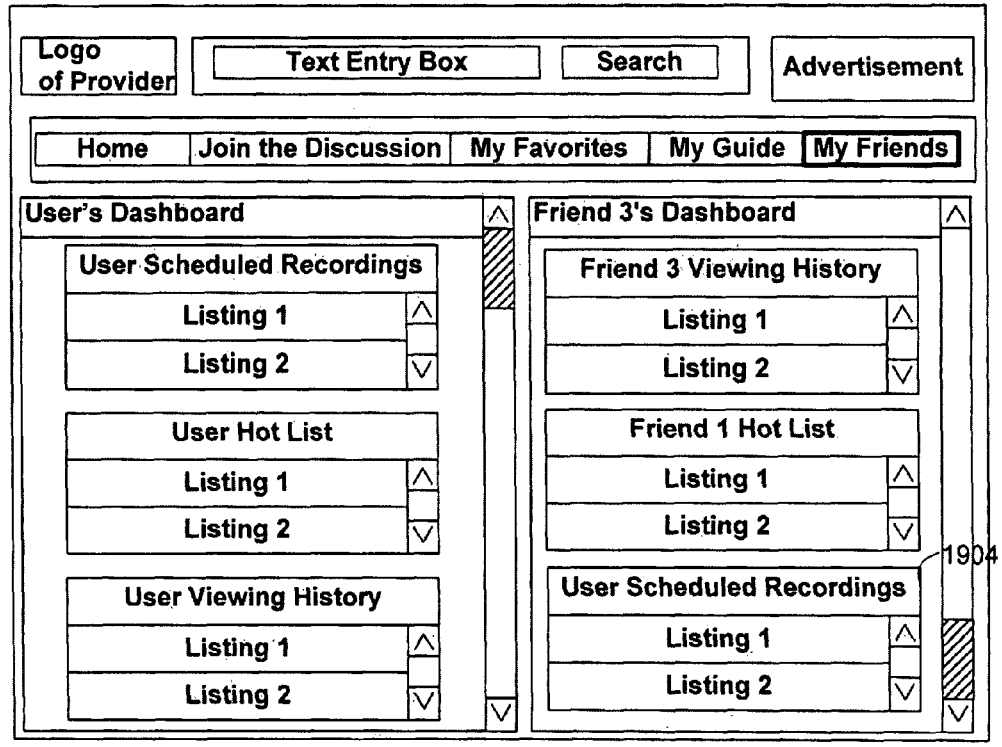

FIG. 19*b* illustrates display 1908, which may be displayed in response to the user adding module 1904 to Friend_3's Dashboard. If Friend_3 is viewing his dashboard (using, e.g., his television program guide) when the user adds module 1904 to Friend_3's dashboard, Friend_3 may see the update happen (nearly) instantaneously or after Friend_3's user equipment is synchronized to include the changes the user made to Friend_3's dashboard. Friend_3's media equipment and media guidance applications may be synchronized automatically (e.g., every few minutes, after a user has remotely updated friendly data, etc.) and/or in response to the friend authorizing the user's changes to be implemented.

Modifications made by a user to friendly data may cause friendly equipment to execute various commands. Some of these commands may cause conflicts with, e.g., commands based on friendly settings or modifications made to the friendly data by other people. For example, module 1904 may be associated with commands to record a program at a time that the friendly equipment is already scheduled to record another program. These conflicts can be overcome in a number of ways, including, for example, prioritizing those who have access to the friendly data. For example, Friend_3 may give a higher priority to any changes that the user makes than the changes Friend_1 makes, but give Friend_2 changes higher priority than the user's changes. Friend_3 may also give the highest priority to settings, etc. that Friend_3 makes or made himself. Friend_3's media guidance application(s) can be used to monitor and maintain various priority lists and to resolve conflicts. Additional systems and methods for resolving conflicts are discussed in commonly assigned Ellis, U.S. patent application Ser. No. 10/306,175, which is incorporated herein by reference in its entirety.

Figure 20:
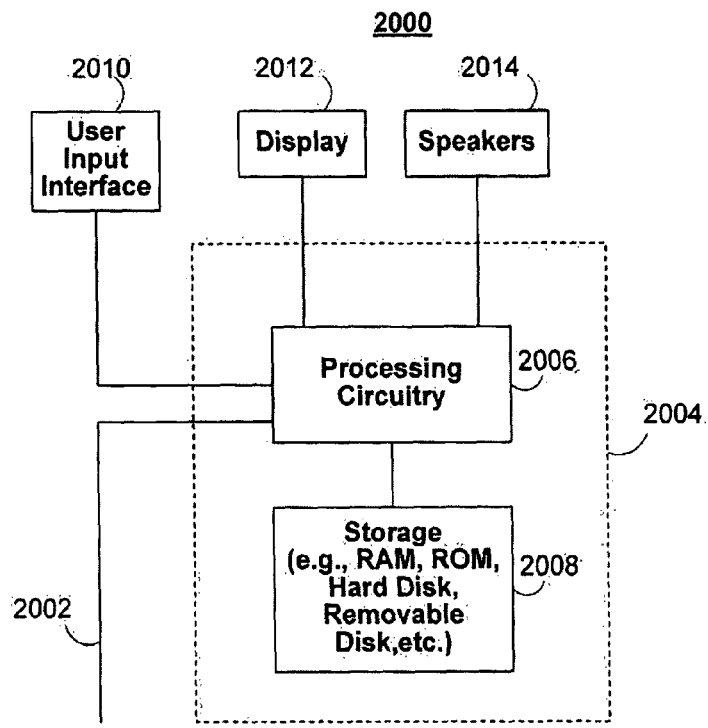
FIG. 20 shows a generalized embodiment of an illustrative an user or friendly equipment device in accordance with one embodiment of the present invention.

Users may access their own and friendly media content and media guidance application(s) (and their display screens described above and below) from one or more of their user equipment devices. FIG. 20 shows a generalized embodiment of illustrative user equipment device 2000. User equipment device 2000 and the components described herein are considered friendly equipment when a friend uses it, when it is used to maintain friendly data and/or implement friendly media guidance applications. More specific implementations of user equipment devices are discussed below in connection with FIG. 21. User equipment device 2000 may receive media content and data via input/output (hereinafter "I/O") path 2002. I/O path 2002 may provide media content (e.g., broadcast programming, on-demand programming, Internet content, and other video or audio) and data to control circuitry 2004, which includes processing circuitry 2006 and storage 2008. Control circuitry 2004 may be used to send and receive commands, requests, and other suitable data using I/O path 2002. I/O path 2002 may connect control circuitry 2004 (and specifically processing circuitry 2006) to one or more communications paths (described below). I/O functions may be provided by one or more of these communications paths, but are shown as a single path in FIG. 20 to avoid overcomplicating the drawing.

Control circuitry 2004 may be based on any suitable processing circuitry 2006 such as processing circuitry based on one or more microprocessors, microcontrollers, digital signal processors, programmable logic devices, etc. In some embodiments, control circuitry 2004 executes instructions for a media guidance application stored in memory (i.e., storage 2008). In client-server based embodiments, control circuitry 2004 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 21). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 2008 that is part of control circuitry 2004. Storage 2008 may include one or more of the above types of storage devices. For example, user equipment device 2000 may include a hard drive for a DVR (sometimes called a personal video recorder, or PVR) and a DVD recorder as a secondary storage device. Storage 2008 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 2004 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 2004 may also include scaler circuitry for upconverting and downconverting media into the preferred output format of the user equipment 2000. Circuitry 2004 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 2008 is provided as a separate device from user equipment 2000, the tuning and encoding circuitry (including multiple tuners) may be associated with storage 2008.

A user may control the control circuitry 2004 using user input interface 2010. User input interface 2010 may be any suitable user interface, such as a remote control, mouse, trackball, keypad, keyboard, touch screen, touch pad, stylus input, joystick, voice recognition interface, or other user input interfaces. Display 2012 may be provided as a stand-alone device or integrated with other elements of user equipment device 2000. Display 2012 may be one or more of a monitor, a television, a liquid crystal display (LCD) for a mobile device, or any other suitable equipment for displaying visual images. In some embodiments, display 2012 may be HDTV-capable. Speakers 2014 may be provided as integrated with other elements of user equipment device 2000 or may be stand-alone units. The audio component of videos and other media content displayed on display 2012 may be played through speakers 2014. In some embodiments, the audio may be distributed to a receiver (not shown), which processes and outputs the audio via speakers 2014.

Figure 21:
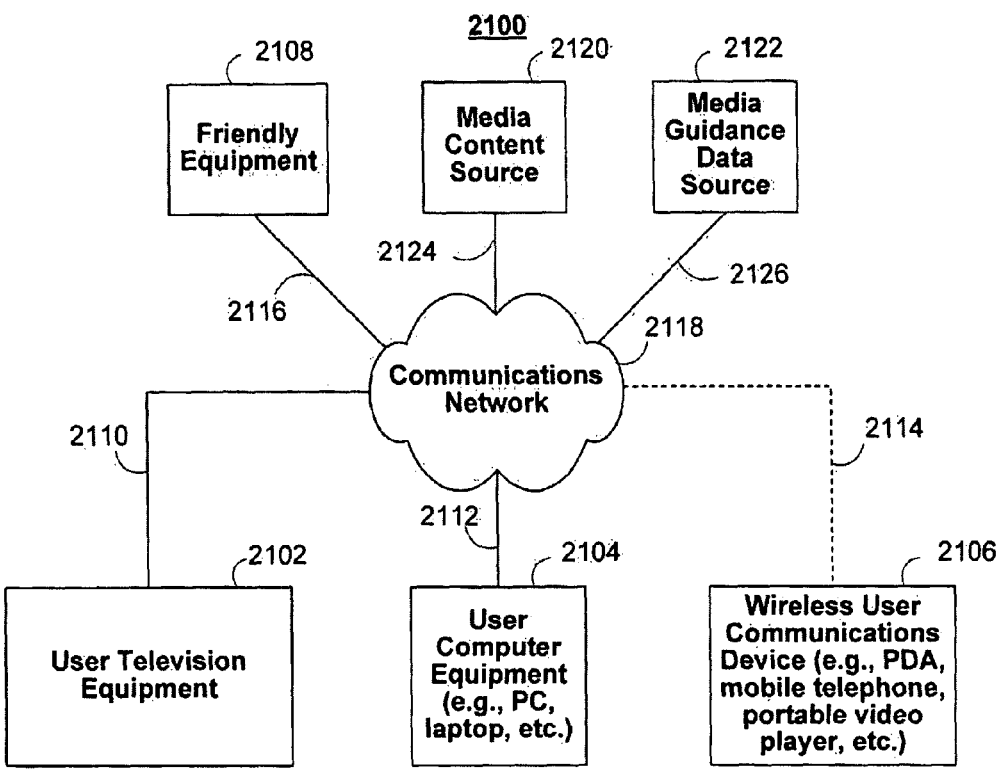
FIG. 21 shows a generalized embodiment of an illustrative interactive media guidance system in accordance with one embodiment of the present invention.

User equipment device 2000 of FIG. 20 can be implemented in system 2100 of FIG. 21 as user television equipment 2102, user computer equipment 2104, wireless user communications device 2106, or any other type of user equipment suitable for accessing media, such as a non-portable gaming machine. Friendly equipment 2108 may also be any type of equipment suitable for accessing media. The only difference between friendly equipment 2108 and the aforementioned user equipment is that friendly equipment 2108 is used by a friend instead of the user. For simplicity, these devices may be referred to herein collectively as user and friendly equipment or user and friendly equipment devices. User and friendly equipment devices, on which a media guidance application is implemented, may function as a standalone device or may be part of a network of devices. Various network configurations of devices, including those that link people together may be implemented and are discussed in more detail below.

User television equipment 2102 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 2104 may include a PC, a laptop, a tablet, a WEBTV™ box, a personal computer television (PC/TV), a PC media server, a PC media center, or other user computer equipment. WEBTV is a trademark owned by Microsoft Corp. Wireless user communications device 2106 may include PDAs, a mobile telephone, a portable video player, a portable music player, a portable gaming machine, or other wireless devices.

It should be noted that with the advent of television tuner cards for PC's, WEBTV™, and the integration of video into other user equipment devices, the lines have become blurred when trying to classify a device as one of the above devices. In fact, each of user television equipment 2102, user computer equipment 2104, and wireless user communications device 2106 may utilize at least some of the system features described above in connection with FIG. 20 and, as a result, include flexibility with respect to the type of media content available on the device. For example, user television equipment 2102 may be Internet-enabled allowing for access to Internet content, while user computer equipment 2104 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 2100, there is typically more than one of each type of user equipment device but only one of each is shown in FIG. 21 to avoid overcomplicating the drawing. Similarly, there is typically a number of friendly equipment in any given network, but only one friendly equipment 2108 is shown in FIG. 21 to avoid overcomplicating the drawing. In addition, each user or friend may utilize more than one type of user equipment device (e.g., a user may have a television set and a computer) and also more than one of each type of user equipment device (e.g., a user may have a PDA and a mobile telephone and/or multiple television sets).

The user, like everybody else, may also set various settings to maintain consistent media guidance application settings across in-home devices and remote devices. Settings can be saved as user data and include those described above and below, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, all of the user's equipment would be synchronized and the same channel would appear as a favorite on the user's in-home devices (e.g., user television equipment and user computer equipment) as well as the user's mobile devices, if desired. Therefore, changes made on one user and friendly equipment device can change the guidance experience on another user and friendly equipment device, regardless of whether they are the same or a different type of user and friendly equipment device. In addition, the changes made may be based on settings input by a user or a friend, as well as user activity and friendly activity monitored by the guidance application(s).

The user and friendly equipment devices may be coupled to communications network 2118. Namely, user television equipment 2102, user computer equipment 2104, wireless user communications device 2106, and friendly equipment 2108 are coupled to communications network 2118 via communications paths 2110, 2112, 2114, and 2116, respectively. Communications network 2118 may be one or more networks including the Internet, a mobile phone network, mobile device (e.g., BLACKBERRY™) network, cable network, public switched telephone network, or other types of communications network or combinations of communications networks. BLACKBERRY™ is a service mark owned by Research In Motion Limited Corp. Paths 2110, 2112, 2114, and 2116 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 2114 is drawn with dotted lines to indicate that in the exemplary embodiment shown in FIG. 21 it is a wireless path and paths 2110, 2112 and 2116 are drawn as solid lines to indicate they are wired paths (although these paths may be wireless paths, if desired). Communications with the user and friendly equipment devices may be provided by one or more of these communications paths, but are shown as a single path in FIG. 21 to avoid overcomplicating the drawing.

Although communications paths are not drawn between user and/or friendly equipment devices, these devices may communicate directly with each other via communication paths, such as those described above in connection with paths 2110, 2112, 2114, and 2116, as well as other short-range point-to-point communication paths, such as USB cables, IEEE 1394 cables, wireless paths (e.g., BLUETOOTH™, infrared, IEEE 802-11x, etc.), or other short-range communication via wired or wireless paths. BLUETOOTH™ is a certification mark owned by Bluetooth SIG, INC. The user and friendly equipment devices may also communicate with each other directly through an indirect path via communications network 2118.

System 2100 includes media content source 2120 and media guidance data source 2122 coupled to communications network 2118 via communication paths 2124 and 2126, respectively. Paths 2124 and 2126 may include any of the communication paths described above in connection with paths 2110, 2112, 2114, and 2116. Communications with the media content source 2120 and media guidance data source 2122 may be exchanged over one or more communications paths, but are shown as a single path in FIG. 21 to avoid overcomplicating the drawing. In addition, there may be more than one of each of media content source 2120 and media guidance data source 2122, but only one of each is shown in FIG. 21 to avoid overcomplicating the drawing. (The different types of each of these sources are discussed below.) If desired, media content source 2120 and media guidance data source 2122 may be integrated as one source device. Although communications between sources 2120 and 2122 with user and friendly equipment devices 2102, 2104, 2106 and 2108 are shown as through communications network 2118, in some embodiments, sources 2120 and 2122 may communicate directly with user and friendly equipment devices 2102, 2104, 2106 and 2108 via communication paths (not shown) such as those described above in connection with paths 2110, 2112, 2114, and 2116.

Media content source 2120 may include one or more types of media distribution equipment including a television distribution facility, cable system headend, satellite distribution facility, programming sources (e.g., television broadcasters, such as NBC™, ABC™, HBO™, etc.), intermediate distribution facilities and/or servers, Internet providers, on-demand media servers, and other media content providers. NBC™ is a trademark owned by the National Broadcasting Company, Inc., ABC™ is a trademark owned by the ABC, INC., and HBO™ is a trademark owned by the Home Box Office, Inc. Media content source 2120 may be the originator of media content (e.g., a television broadcaster, a Webcast provider, etc.) or may not be the originator of media content (e.g., an on-demand media content provider, an Internet provider of video content of broadcast programs for downloading, etc.). Media content source 2120 may include cable sources, satellite providers, on-demand providers, Internet providers, or other providers of media content. Media content source 2120 may also include a remote media server used to store different types of media content (including video content selected by a user), in a location remote from any of the user and/or friendly equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 2122 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user and other people to navigate among and locate desired media selections.

Media guidance application data may be provided to the user and friendly equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user and friendly equipment on a television channel sideband, in the vertical blanking interval of a television channel, using an in-band digital signal, using an out-of-band digital signal, or by any other suitable data transmission technique. Program schedule data and other guidance data may be provided to user and friendly equipment on multiple analog or digital television channels. Program schedule data and other guidance data may be provided to the user and friendly equipment with any suitable frequency (e.g., continuously, daily, a user-specified period of time, a system-specified period of time, in response to a request from user equipment, etc.). In some approaches, guidance data from media guidance data source 2122 may be provided to users' and friends' equipment using a client-server approach. For example, a guidance application client residing on the user's and/or friends' equipment may initiate sessions with source 2122 to obtain guidance data when needed. Media guidance data source 2122 may provide user and friendly equipment devices 2102, 2104, 2106 and 2108 the media guidance application itself or software updates for the media guidance application.

Media guidance applications may be, for example, standalone applications implemented on user and friendly equipment devices. In other embodiments, media guidance applications may be client-server applications where only the client resides on the user equipment device. For example, media guidance applications may be implemented partially as a client application on control circuitry 2004 of user equipment device 2000 and partially on a remote server as a server application (e.g., media guidance data source 2122). The guidance application displays may be generated by the media guidance data source 2122 and transmitted to the user and friendly equipment devices. The media guidance data source 2122 may also transmit data for storage on the user and friendly equipment, which then generates the guidance application displays based on instructions processed by control circuitry.

Media guidance system 2100 is intended to illustrate a number of approaches, or network configurations, by which user and friendly equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 21.

In one approach, user equipment devices may communicate with each other within a home network. User equipment devices can communicate with each other directly via short-range point-to-point communication schemes describe above, via indirect paths through a hub or other similar device provided on a home network, or via communications network 2118. Each of the multiple individuals in a single home may operate different user equipment devices on the home network. As a result, it may be desirable for various media guidance information or settings to be communicated between the different user equipment devices. For example, it may be desirable for users to synchronize and maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 2120 to access media content. Specifically, within a home, users of user television equipment 2104 and user computer equipment 2106 may access the media guidance application to navigate among and locate desirable media content. Users may also access the media guidance application outside of the home using wireless user communications devices 2106 to navigate among and locate desirable media content.

Figure 22:
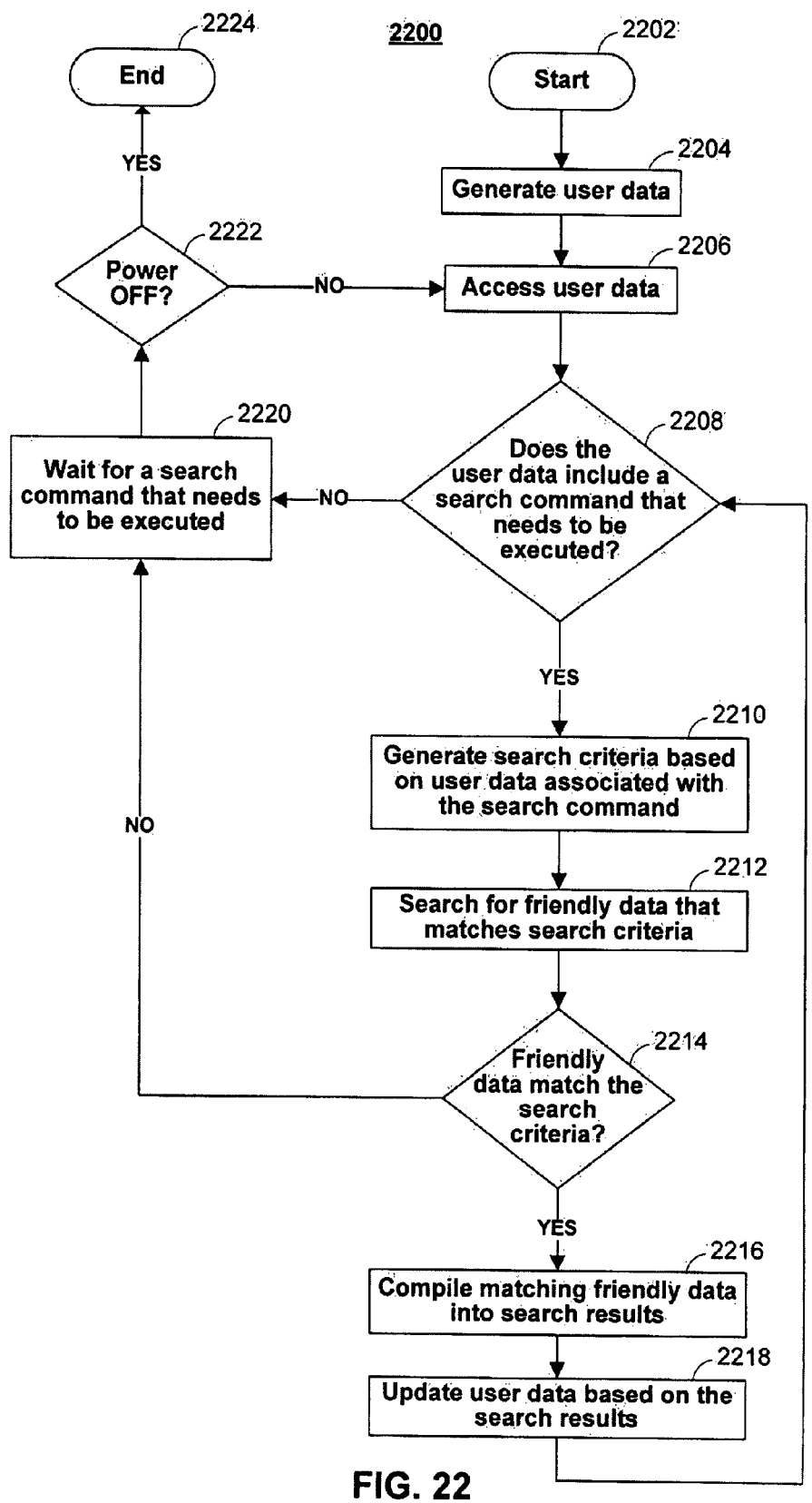
FIGS. 22-23 are flow diagrams of illustrative processes that can be used in accordance with various embodiments of the present invention.

Further to the discussion above, exemplary methods for utilizing user and friendly data are discussed below. FIG. 22 shows process 2200, which can be used to search for friendly data and modify user data when appropriate.

Process 2200 starts at step 2202. User data is generated at step 2204 by, for example, a media guidance application implemented on user equipment. User data may include any type of computer-readable data related to the user. For example, user data may include user profile data (i.e., data associated with the user's media profile(s)), user account data (i.e., data that a service provider uses to identify a user and what media and/or services the user is entitled to receive), authorization data, and any other user-specific data. The user data can be subdivided into one or more data files and formatted in any number of ways. The user data may be used by any type of device, apparatus, system and/or application. User data, like any other data discussed herein, may be stored on a computer-readable medium and include executable commands (such as at least one, e.g., search command, share command, record command, remind command, delete command, etc.). The executable commands may be conditional and require, for example, a particular condition (e.g., time and day of week) to be met before being executed.

User data can be generated automatically by, e.g., user equipment, friendly equipment, a media content source, a media data source, any other device or apparatus, an application implemented on any such device or apparatus, or any combination thereof. User data can also be generated in response to a manual input by the user or a friend. As discussed above, the user and/or friend may have to be identified before the present invention will allow the user or friend to generate user data. One skilled in the art would appreciate that friendly data is the same as user data, except friendly data is associated with a friend and not the user.

At step 2206 the user data is accessed by an electronic device or application. The electronic device or application may be accessing user data in response to, e.g., a user request, an automatically generated executable command, or a condition of previously generated executable command being met. For example, a remote server may access the user data that was generated and/or stored on a storage device included in user equipment. As another example, user equipment may access user data stored on the same or other user equipment.

Process 2200 advances to step 2208, where the system determines whether the user data includes a search command that needs to be executed. A search command is an executable command that may or may not be conditional. A search command may be automatically generated or generated in response to a user input and, if a non-conditional search command has not yet been executed, should be executed. For example, the user may select a module on the user's dashboard and indicate that he would like the system to search for similar modules. Such a user input, would cause the system to generate a non-conditional search command that needs to be executed. A conditional search command may be based on, for example, dynamic data (which is discussed above) and need to be executed if the dynamic data changes. A conditional search command should only be executed when the condition(s) are satisfied.

Process 2200 proceeds to step 2210 in response to the system of the present invention (e.g., media guidance application) determining that there is a search command that needs to be executed. At step 2210 a media guidance application generates search criteria (which may be based on and/or include user data associated with the search command).

At step 2212 the system of the present invention searches for friendly data that matches the search criteria. One or more media guidance applications implemented on user and/or friendly user equipment as well as other applications implemented on one or more media content sources and/or media guidance sources can be used to search for friendly data. For example, the user media guidance application may distribute the search criteria to a number of friendly media guidance application and let each friendly media guidance applications search its respective friendly equipment for friendly data that matches the search criteria. As another example, all media guidance applications may upload all user data and friendly data to one or more central servers (such as, e.g., media guidance data sources) that each has one or more applications running that can search for friendly data that matches the search criteria.

At step 2214 the user's media guidance application determines whether or not there is any friendly data that matches the search criteria. Process 2200 proceeds to step 2216 in response to the user's media guidance application determining that there is friendly data that matches the search criteria.

At step 2216 the matching friendly data is compiled into search results. The search results may be data that can be displayed to the user after being, for example, processed into lists of information, modules of media, etc.

At step 2218 the user data is updated based on the search results. The updates are saved and may include substantive modifications (additions and deletions) to the user data that effect, for example, a conditional executable command or information included in a display that is presented to the user. For example, the user data may include a dynamic parental control setting that blocks any friendly data that is inappropriate for children. If the search results no longer include a friend's recommendations because the friend's recommendations are now inappropriate for children, then that friend's recommendations will be automatically removed from the user data. The updates may also include non-substantive changes to the user data. Non-substantive changes may comprise, for example, time stamps of when the search command was executed, when the search was completed, as well as other types of data that do not trigger executable commands or influence the information included in any display screen.

Process 2200 then returns to step 2208. A determination is made at step 2208 as to whether or not the updated user data includes a search command that needs to be executed. When there is such a search command in the updated user data, the process proceeds to step 2208 as discussed above. If not, process 2200 advances to step 2220.

At step 2220 the system waits for a search command that needs to be executed. Step 2220 may also follow step 2214 when, at step 2214, the system determines there is not any friendly data that matches the search criteria. One skilled in the art would appreciate that additional steps and/or displays may be included in the process and, e.g., the user may be notified there is not any friendly data that matches the search criteria.

While the system is waiting for such a search command, the system may be powered OFF. When the system is powered OFF, process 2200 ends at step 2224. When the system remains ON, the system may continue to access the user data in the event that a search command is triggered.

Figure 23A:
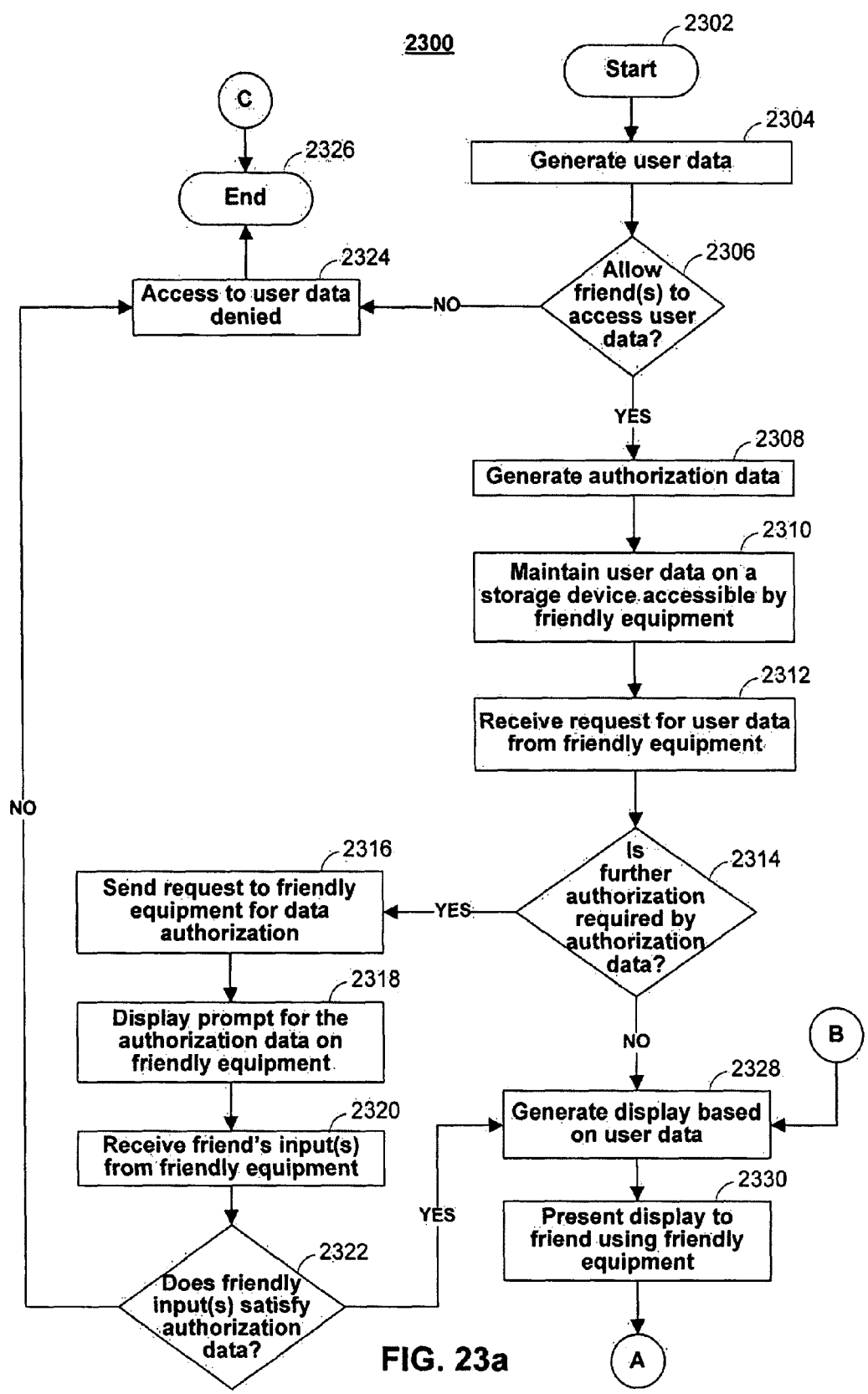
Figure 23B:
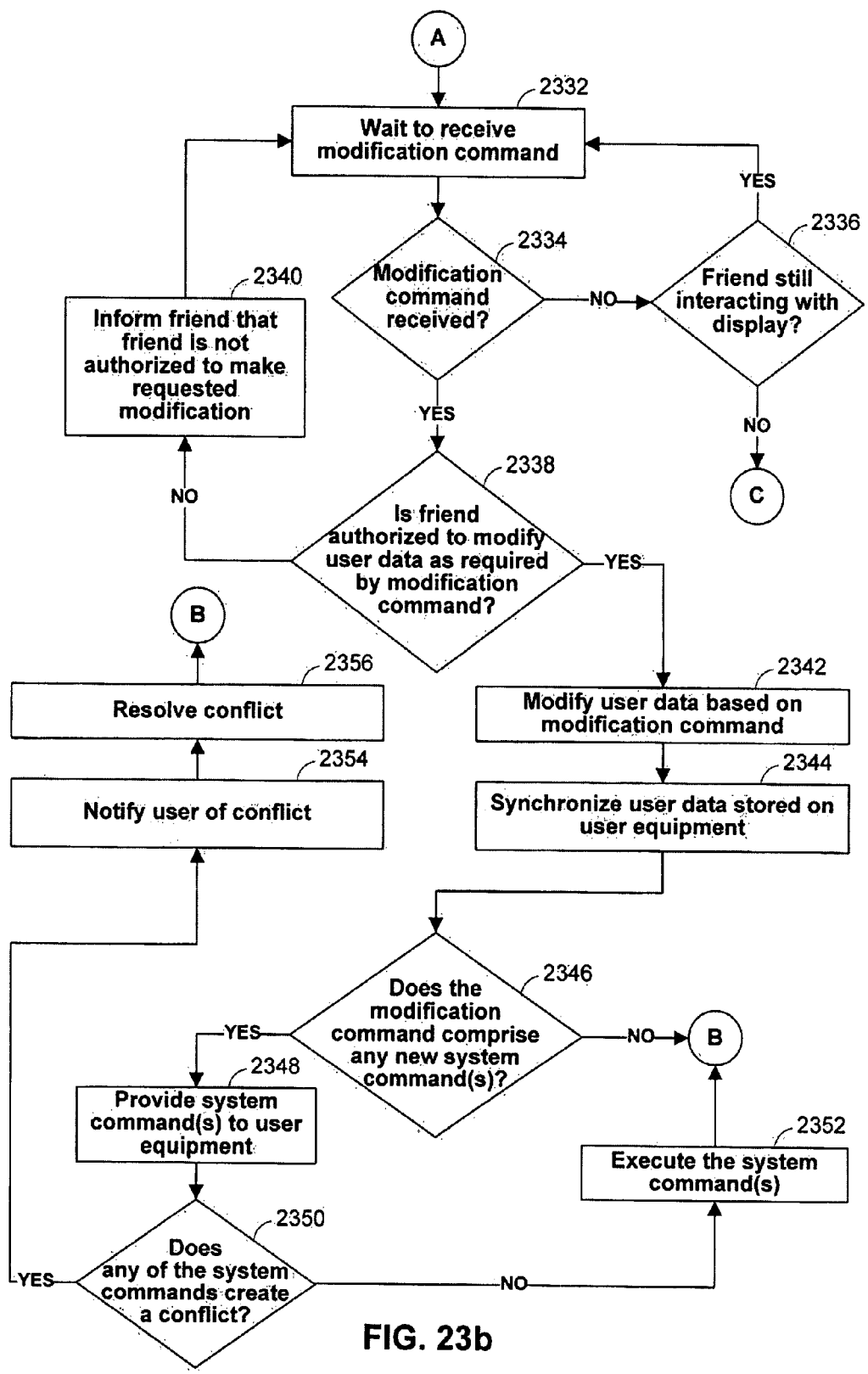

FIGS. 23*a* and 23*b* show process 2300, which is an exemplary method of allowing a friend to modify user data. One skilled in the art would appreciate that a similar or the same process could enable the user to modify friendly data.

Process 2300 begins at step 2302 and at step 2304 user data is generated. User data may be generated by, e.g., a media guidance application or central server in response to a user input, friendly input or system generated command.

At step 2306 a determination is made as to whether or not one or more friends may be allowed to access the user data. A media guidance application may be configured to, for example, make some or all user data available to all people (by, e.g., publishing to a public website, etc.), only some people (by, e.g., requiring a username and/or password be entered, etc.), etc.

When one or more friends are going to be able to access the user data, process 2300 advances to step 2308. At step 2308 authorization data is generated. The authorization data may allow, for example, the authorized person or people (which may be everybody) to access the user data.

At step 2310 the system maintains the user data (which may include transferring user data from user equipment to other equipment, synchronizing the authorization data, etc.) on one or more storage devices that are accessible by friendly equipment. For example, the user data may be uploaded to one or more central servers that friendly equipment have access to. As another example, the user data may be copied directly onto one or more pieces of friendly equipment (e.g., those having IP addresses included in the authorization data).

At step 2312 a request originating from friendly equipment for user data is received by the system and at step 2314 the system determines whether further authorization is required. Further authorization may be required by the authorization data depending on, for example, the device from which the request originated, the particular user data requested, etc.

In response to the system determining that additional authorization data is required, process 2300 proceeds to step 2316, at which the system sends a request to the friendly equipment for the additional authorization data.

At step 2318 the friendly equipment prompts the friend to input information that can be processed into data, which satisfies the required authorization data. At step 2320 the system receives from the friendly equipment data that corresponds to the friendly input.

The system determines at step 2322 whether or not the friendly input corresponds with data that satisfies the authorization data. At step 2324 the friend is denied access to the user data if the friendly input data fails to satisfy the authorization data and process 2300 ends at step 2326.

In response to the system determining at step 2322 that the friendly input data matches or otherwise satisfies the requirements of the authorization data, process 2300 proceeds to step 2328. At step 2328 a display is generated (which may be similar to or the same as display 1800 of FIG. 18) that includes information associated with user data. The display may be generated by, e.g., friendly equipment or by another electronic device and uploaded to the friendly equipment.

At step 2330 the friendly equipment presents the display to a friend and at step 2332 the system waits to receive a modification command. At step 2334 the system determines whether or not a modification command is received. If a modification command is not received, the system determines at step 2336 whether or not the friend is still interacting with the display. The friend may be, for example, just viewing the display and not modifying it, and process 2300 will return to step 2332. When the system determines at step 2336 that the friend has stopped interacting with the display (e.g., the display timed-out, a screen saver has been activated, the program guide was closed, the friendly equipment has sent a signal to the system, etc.), process 2300 proceeds to step 2326 and ends.

When the system determines at step 2334 that it has received a modification command (e.g., a command that may modify the user data), process 2300 proceeds to step 2338. At step 2338 the system determines whether or not the friend and/or friendly equipment is authorized to modify the user data as required by the modification command. If not, step 2340 is next in process 2300, at which the friend is informed (via, e.g., a display presented on user equipment) that the friend is not authorized to make the requested modification.

Step 2342 will follow step 2338 when the friend is authorized to modify the user data as required by the modification command. At step 2342 the user data is modified (by, e.g., the system or the friendly equipment) based on the modification command.

At step 2344 the user data, as modified, is synchronized with the user data stored on the user equipment, thereby updating the user data on the user equipment accordingly. If the user happens to be interacting with the user equipment when the synchronization occurs, the user may be able to see the changes to, for example, the user profile, recordings list, etc. In other embodiments, the user may be prompted to approve the modifications to the user data before the modifications are finalized.

At step 2346 a determination is made as to whether or not the modification command comprises a new system command. A system command may include a recording command, a series recording command, a reminder command, a delete command, an order command (for movies and/or additional services), or any other command that causes or will cause the user equipment or central server to coordinate various pieces of hardware (e.g., a digital storage device, a television display, On-Demand server, web camera, etc.). If the modification command lacks a new system command (because, e.g., the system command was previously set, or there was no system command associated with the modification command), process 2300 returns to step 2328 and a display is generated based on the modified user data.

Process 2300 advances to step 2348 when the modification command comprises a new system command. At step 2348 the user equipment or application implemented thereon is provided the system command.

At step 2350 the user equipment or an application implemented thereon determines whether or not the new system command creates a conflict with any previously configured system commands. If not, the user equipment or an application implemented thereon executes at step 2352 the new system command and process 2300 then proceeds to step 2328 (discussed above).

When the user equipment or application determines at step 2350 that the new system command creates a conflict with a previous configured system command, a notification is presented to the user. If the user is not using the user equipment at the time, the notification can be queued for the user to view in the future. Process 2300 then proceeds to step 2356 and resolves the conflict as discussed above in connection with, e.g., FIG. 19*b*.

The processes discussed above are intended to be illustrative and not limiting. One skilled in the art would appreciate that steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes.

What is claimed is:

1. A method for utilizing user profile data corresponding to a user, comprising:
   accessing the user profile data corresponding to the user, wherein the user profile data is associated with a previously viewed media asset;
   accessing a friends list, wherein the friends list identifies one or more persons with whom the user has exchanged friend requests;
   receiving a user selection of a selectable search option that, when selected, causes a command to be executed to search through data of one or more friendly profiles corresponding to the one or more persons of the friends list, wherein each friendly profile of the one or more friendly profiles comprises data associated with media assets; and
   in response to receiving the user selection of the selectable search option:
      identifying information from the user profile data for use in generating search criteria, wherein the identified information includes data corresponding to the previously viewed media asset;
      generating search criteria by utilizing the identified information;
      accessing at least one storage device that is used to store the data associated with the one or more friendly profiles;
      searching the at least one storage device for data associated with the one or more friendly profiles that matches the search criteria, wherein the data associated with the one or more friendly profiles is searched;
      generating search results that comprise data that matches the search criteria; and
      generating a viewing recommendation of a recommended media asset for display based on the search results.

2. The method of claim 1, wherein accessing the at least one storage device further comprises:
   uploading the user profile data from user equipment to the at least one storage device, wherein the interactive media guidance application implemented on the user equipment facilitates the uploading of the user profile data to a remote server.

3. The method of claim 1, wherein searching the at least one storage device further comprises:
   determining that there is no matching data stored on a first storage device; and
   in response to the determination, accessing a second storage device used to store additional data associated with the one or more friendly profiles.

4. The method of claim 1, wherein the search criteria includes data associated with a mood.

5. The method of claim 1, wherein the data associated with the one or more friendly profiles includes data associated with media assets that one or more friends previously watched.

6. The method of claim 1 further comprising:
   automatically updating the user profile data in response to the user viewing different media assets;
   accessing the user profile data associated with the different media assets; and
   generating new search criteria associated with the updated user profile data.

7. The method of claim 6 further comprising:
determining that a first friendly profile does not match the new search criteria; and
in response to the determination, deleting the person associated with the first friendly profile from the friends list.

8. The method of claim 1 further comprising:
determining that at least one friendly profile included in the search results is associated with additional data that the user profile designates as being dangerous; and
in response to the determination, blocking each person associated with the at least one friendly profile from the friends list.

9. The method of claim 1, wherein an additional recommended media asset is recommended by a friend associated with a friendly profile of the one or more friendly profiles.

10. The method of claim 1, further comprising generating for display a representation of a person of the one or more persons identified by the friends list who corresponds to the viewing recommendation of the recommended media asset.

11. A system that utilizes user profile data corresponding to a user, comprising:
a processor configured to:
access a user storage device that stores the user profile data corresponding to the user and a friends list, wherein the friends list identifies one or more persons with whom the user has exchanged friend requests;
access a second storage device that stores, for each person of the friends list, friendly profile data associated with media assets;
access the user profile data corresponding to the user, wherein the user profile data is associated with a previously viewed media asset;
receive a user selection of a selectable search option that, when selected, causes a command to be executed to search through data of one or more friendly profiles corresponding to the one or more persons of the friends list, wherein each friendly profile of the one or more friendly profiles comprises data associated with media assets; and
in response to receiving the user selection of the selectable search option:
identify information from the user profile data for use in generating search criteria, wherein the identified information includes data corresponding to the previously viewed media asset;
generate search criteria by utilizing the identified information;
request data associated with the one or more friendly profiles that matches the search criteria, wherein the request causes the data associated with the one or more friendly profiles to be searched;
receive the matching data associated with the one or more friendly profiles from the second storage device;
generate search results that comprise data that matches the search criteria; and
generate a viewing recommendation of a recommended media asset for display based on the search results.

12. The system of claim 11, wherein the request for the data associated with the one or more friendly profiles further comprises:
uploading the user profile data from the user equipment to a server that has access to the one or more friendly profiles.

13. The system of claim 12 further comprising:
friendly equipment on which a friendly media guidance application is implemented, wherein the friendly media guidance application is configured to:
upload the friendly profile data from the second storage device to the server.

14. The system of claim 11, wherein the second storage device is a server database that is electronically coupled to the user equipment and friendly equipment.

15. The system of claim 11, wherein the search criteria includes data associated with a mood.

16. The system of claim 11, wherein the data associated with the one or more friendly profiles includes data associated with a media asset that one or more friends previously watched.

17. The system of claim 11, wherein the user media guidance application is further configured to:
automatically update the user profile data in response to the user viewing different media assets; and
generate new search criteria associated with the updated user profile data.

18. The system of claim 17, wherein the user media guidance application is further configured to:
determine that a first friendly profile does not match the new search criteria; and
in response to the determination, delete the person associated with the first friendly profile from the friends list.

19. The system of claim 17, wherein the user media guidance application is further configured to:
determine that a new friendly profile matches the new search criteria; and
associate the new friendly profile with a friends list.

20. The system of claim 11, wherein the user media guidance application is further configured to:
determine that the at least one friendly profile included in the search results is associated with additional data that the user profile designates as being dangerous; and
in response to the determination, block each person associated with the at least one friendly profile from the friends list.

21. The system of claim 11, wherein an additional recommended media asset is recommended by a friend associated with a friendly profile of the one or more friendly profiles.

22. The system of claim 11, wherein the processor is further configured to generate for display a representation of a person of the one or more persons identified by the friends list who corresponds to the viewing recommendation of the recommended media asset.

23. A system that utilizes user profile data corresponding to a user, comprising:
means for accessing the user profile data corresponding to the user, wherein the user profile data is associated with a previously viewed media asset;
means for accessing a friends list, wherein the friends list identifies one or more persons with whom the user has exchanged friend requests;
means for receiving a user selection of a selectable search option that, when selected, causes a command to be executed to search through data of one or more friendly profiles corresponding to the one or more persons of the friends list, wherein each friendly profile of the one or more friendly profiles comprises data associated with media assets; and
in response to receiving the user selection of the selectable search option:
means for identifying information from the user profile data for use in generating search criteria, wherein the identified information includes data corresponding to the previously viewed media asset;
means for generating search criteria by utilizing the identified information;

means for accessing at least one storage device that is used to store data associated with the one or more friendly profiles;

means for searching the at least one storage device for data associated with the one or more friendly profiles that matches the search criteria, wherein data associated with the one or more friendly profiles is searched;

means for generating search results that comprise friendly profile data that matches the search criteria; and means for generating a viewing recommendation of a recommended media asset for display based on the search results.

24. The system of claim 23, wherein means for accessing the at least one storage device further comprises:

means for uploading the user profile data from user equipment to the at least one storage device, wherein the interactive media guidance application implemented on the user equipment facilitates the uploading of the user profile data to a remote server.

25. The system of claim 23, wherein means for searching the at least one storage device further comprises:

means for determining that there is no matching data stored on a first storage device; and in response to the determination, means for accessing a second storage device used to store additional data associated with the one or more friendly profiles.

26. The system of claim 23, wherein the search criteria includes data associated with a mood.

27. The system of claim 23, wherein the data associated with the one or more friendly profiles includes data associated with a media asset that one or more friends previously watched.

28. The system of claim 23 further comprising:

means for automatically updating the user profile data in response to the user viewing a different media asset;

means for accessing the user profile data associated with the different media asset; and means for generating new search criteria associated with the updated user profile data.

29. The system of claim 28 further comprising:

means for determining that a first friendly profile does not match the new search criteria; and in response to the determination, means for deleting the person associated with the first friendly profile from the friends list.

30. The system of claim 28 further comprising:

means for determining that a new friendly profile matches the new search criteria; and means for associating the new friendly profile with a friends list.

31. The system of claim 23 further comprising:

means for determining that at least one friendly profile included in the search results is associated with additional data that the user profile designates as being dangerous; and in response to the determination, means for blocking each person associated with the at least one friendly profile from the friends list.

32. The system of claim 23, wherein an additional recommended media asset is recommended by a friend associated with a friendly profile of the one or more friendly profiles.

33. The system of claim 23, further comprising means for generating for display a representation of a person of the one or more persons identified by the friends list who corresponds to the viewing recommendation of the recommended media asset.

34. A method for utilizing user profile data corresponding to a user, comprising:

accessing the user profile data corresponding to the user, wherein the user profile data is associated with a previously viewed media asset;

accessing a friends list, wherein the friends list identifies one or more persons with whom the user has exchanged friend requests;

receiving a user input from the user, wherein the user input is associated with a command to search for persons among the one or more persons identified by the friends list, wherein each person of the one or more persons identified by the friends list is associated with a friendly profile, and wherein each friendly profile associated with the persons identified by the friends list comprises data associated with media assets;

identifying information from the user profile data for use in generating search criteria, wherein the identified information includes data corresponding to the previously viewed media asset;

generating search criteria by utilizing the identified information;

accessing at least one storage device that is used to store the data associated with the friendly profiles associated with the persons identified by the friends list;

searching the at least one storage device for data associated with the friendly profiles associated with the persons identified by the friends list that matches the search criteria, wherein the data associated with a friendly profile associated with a person identified by the friends list is searched;

generating search results that include at least one friendly profile that comprises data associated with the friendly profiles associated with the persons identified by the friends list that matches the search criteria and identify persons who correspond to the included at least one friendly profile; and generating the search results for display to the user, wherein the displayed search results identify the persons who correspond to the at least one friendly profile that matches the search criteria.

35. A system that utilizes user profile data corresponding to a user, comprising:

a processor configured to:

access a user storage device that stores the user profile data corresponding to the user and a friends list, wherein the friends list identifies one or more persons with whom the user has exchanged friend requests;

access a second storage device that stores, for each person of the friends list, friendly profile data associated with media assets;

access the user profile data, wherein the user profile data is associated with a previously viewed media asset;

receive a user input from the user, wherein the user input is associated with a command to search for persons among the one or more persons identified by the friends list, wherein each person of the one or more persons identified by the friends list is associated with a friendly profile, and wherein each friendly profile associated with the persons identified by the friends list comprises data associated with media assets;

identify information from the user profile data for use in generating search criteria, wherein the identified information includes data corresponding to the previously viewed media asset;

generate search criteria by utilizing the identified information;

request data associated with the one or more friendly profiles that matches the search criteria, wherein the request causes the data associated with a friendly profile associated with a person identified by the friends list to be searched;

receive the matching data from the second storage device;

generate search results that include at least one friendly profile that comprises data associated with the friendly profiles associated with the persons identified by the friends list that matches the search criteria; and generate the search results for display to the user, wherein the displayed search results identify the persons who correspond to the at least one friendly profile that matches the search criteria.

* * * * *